United States Patent [19]

Epstein

[11] 3,798,378

[45] Mar. 19, 1974

[54] FRAME SYNCHRONIZATION SYSTEM

[75] Inventor: Marvin A. Epstein, Monsey, N.Y.

[73] Assignee: International Telephone and Telegraph Corporation, Nutley, N.J.

[22] Filed: Nov. 7, 1972

[21] Appl. No.: 304,435

[52] U.S. Cl.......................... 179/15 BS, 178/69.5 R
[51] Int. Cl................................................ H04j 3/06
[58] Field of Search.................... 179/15 BS, 15 AF; 178/69.5 R

[56] References Cited

UNITED STATES PATENTS

| | | | |
|---|---|---|---|
| 3,662,114 | 5/1972 | Clark | 179/15 BS |
| 3,754,102 | 8/1973 | Clark | 179/15 BS |

*Primary Examiner*—Ralph D. Blakeslee
*Attorney, Agent, or Firm*—John T. O'Halloran; Menotti J. Lombardi, Jr.; Alfred C. Hill

[57] ABSTRACT

There is disclosed herein a frame synchronization system for a binary data TDM signal including a multiframe having X superframes, each of the X superframes including M midframes, each of the M midframes including m subframes, and each of the m subframes including *x* ports or channel times. The data signal includes an overhead channel having overhead data including a first sync signal having a first predetermined pattern composed of Y bits disposed in adjacent ones of the M midframes and a second sync signal having a second predetermined pattern different than the first predetermined pattern composed of M bits, each of the M bits being disposed in a different one of the M midframes, where X, M, *m*, *x* and Y are all integers greater than one. The data bit rate clock is extracted from the data signal and applied to a cascade connection of a port counter, a subframe counter, a midframe counter and a superframe counter which together with decoding and gating logic associated with each of the above-mentioned counters produces local timing signals including a first reference signal for the first sync signal of the data signal and a second reference signal for the second sync signal of the data signal. In response to one of the local timing signals, such as the overhead channel port timing signal, the overhead data is demultiplexed from the data signal. A first comparator compares the first reference signal to the bits of the data signal to produce a first output signal indicating matches and mismatches between the first reference signal and the data bits. A second comparator circuit compares the overhead bits with the second reference signal and produces a second output signal indicative of the matches and mismatches therebetween. A decision circuit including a digital integrator in the form of an up-down counter and threshold detectors produce a first control signal when the output signal of the counter is equal to or less than a predetermined lower threshold level and a second control signal is produced when the output of the counter is equal to or greater than a predetermined upper threshold level. A mode control capable of producing signals indicative of three different modes of operation is coupled to the threshold detectors and responds to both of the control signals. Gates are coupled between the first and second comparators and the decision counter which under control of the mode control circuit output signal representing a first mode couples the first output signal to the decision counter and under control of the mode control circuit output signal representing a second mode couples the second output signal to the decision counter. The second reference signal is produced by the states of the stages of the superframe counter and in a third mode between the first and second modes mentioned hereinabove the overhead data, under control of the mode control circuit output signal representing the third mode, is coupled to the stages of the superframe counter to provide an assumed error free second reference signal. During the first mode of operation the first output signal is coupled to the decision counter and when the first control signal is below or equal to the lower threshold level and there is a mismatch indicated in the first output signal a gate disposed between the bit clock and the port counter is operated to block the application of the bit clock to the port counter to cause a shift in the phase of the local timing signals to establish and maintain synchronization to midframes of the received data signal. In the second mode of operation if the proper phase of the second sync signal is detected synchronization of the superframe and hence the multiframe is established and maintained. If the proper phase of the second sync signal is not detected, the mode control circuit will cause the framing circuit to revert to the first mode of operation and start the framing operation cycle again to properly establish and maintain the desired synchronization.

24 Claims, 15 Drawing Figures

PATENTED MAR 19 1974

3,798,378

SHEET 03 OF 12

PATENTED MAR 19 1974 3,798,378

SHEET 10 OF 12

FRAME SYNCHRONIZATION SYSTEM

BACKGROUND OF THE INVENTION

This invention relates to digital time division multiplex (TDM) communication systems and more particularly to a frame synchronization system for utilization therein. The frame synchronization system of the present invention is particularly useful for very lengthly TDM formats and especially for asynchronous demultiplexers and/or when a small percentage of the bit rate may be allotted for sync bits.

The U. S. Pat. No. 3,662,114 of J. M. Clark discloses a frame synchronization system which provides frame synchronization using two sync signals. This frame synchronization system operates upon binary data signals having a multiframe including M frames, each of the frames including M channels and a first sync signal, at least one of the channel signals including in each of the frames a different one of (N−1) subchannel signals and a second sync signal. The equipment involved employs two sync signal detectors, one being responsive to the first sync signal and a first predetermined local timing signal therefor to provide a first control signal indicative of the phase relation between these two signals and the other sync detector being responsive to the second sync signal and a second predetermined local timing signal therefor to provide a second control signal indicative of the phase relation between these two signals. The two control signals are sampled by two different sampling circuits. The outputs of the sampling circuits are applied to two different decision circuits or integrators whose outputs control the timing of two different cascade connected digital counters and timing signal generators associated therewith to generate necessary timing signals including the two predetermined local timing signals. The first digital counter and generator is driven by a bit rate clock which is inhibited when the decision circuit associated therewith indicates an out-of-sync condition. The second digital counter and generator is driven by a frame rate clock from the first counter and generator which is inhibited when the decision circuit associated therewith indicates an out-of-sync condition. In one disclosed embodiment, the decision circuits are dual integrators each generating two signals to separately control the inhibiting when required. In another disclosed embodiment, the decision circuits are single integrators each producing one signal to control the inhibiting when required, the signal of the decision circuit associated with the second sync signal being connected in a cooperate manner with the signal of the decision circuit associated with the first sync signal to control the inhibiting of the bit rate clock.

In a copending application of R. H. Haussmann and M. A. Epstein, Ser. No. 205,093, filed Dec. 6, 1971, there is disclosed still another frame synchronization system operating on binary data signals having two different sync signals. In this arrangement a binary data transmission system employing a sending station and a receiving station with intermediate stations disposed therebetween in tandem is provided. The binary data signal transmitted by such a system including in a predetermined TDM frame period M groups of TDM channel data signals, each of the groups of channel signals having a normal sync signal. Each of the intermediate stations and the receiving station monitor the received and transmitted M groups of channel data signals on a time sequential basis. A frame synchronization system detects the lack of sync in any of the groups applied thereto on a time sequential basis and substitutes for the thusly detected erroneous group of channel signals dummy data signals including dummy sync signals. To prevent stations subsequent to the station substituting the dummy data signals for erroneous normal data signals providing an erroneous error indication and an erroneous substitution of dummy data for error free normal data signal, the frame synchronization system detects, establishes and maintains sync of each monitored group of channel signals in response to either the normal sync signal or the dummy sync signal. The frame synchronization system provides a variable search time to establish the desired synchronization to either normal or dummy sync signals for each group of channel data signal coupled thereto.

In a copending application of J. M. Clark, Ser. No. 251,895 filed May 10, 1972, there is disclosed a further frame synchronization system operating on binary data signals having two different sync signals. The binary data signal includes a superframe having M midframes, each of the M midframes including $m$ subframes. The data signal also includes a first sync signal having a first predetermined pattern disposed in each of the M midframes and a second sync signal having a second predetermined pattern different than the first pattern composed of M bits, each of the M bits being disposed in a different one of the M midframes, where M and $m$ are integers greater than one. A data bit rate clock is extracted from the data signal and applied to a cascade connection of digital dividers to provide local timing, including subframe rate timing signals, midframe rate timing signals, superframe rate timing signals, and a locally generated first sync signal and an S-stage shift register and feedback logic generates locally the second sync signal. A first digital comparator compares the locally generated first sync signal with the first sync signal contained in the data signal and the resulting matches and mismatches are integrated in a digital integrator, such as an up-down counter. When the count of the digital integrator is below a predetermined count threshold and a mismatch is present at a time defining when the first sync signal contained in the data signal should occur relative to the local timing, a HALT signal is produced which inhibits the flow of the bit rate clock pulses to the first counter of the cascade connected counters (dividers) so as to control the phase of the timing signals with respect to the data signal to establish and maintain synchronization of the local timing to the midframes of the data signal. The received second sync signal and the locally generated second sync signal are compared a bit at a time in a digital comparator, which produce as the result of bit error in the received second sync signal or as the result of incorrect phase of the locally generated second sync signal, matches and mismatches which are also applied to the digital integrator. When the count of the digital integrator is less than a second count threshold different that the first threshold, a switching logic connects the received second sync signal to the shift register to provide therein error free bits of a portion of the received second sync signal which through the cooperation of the feedback logic generates an error free locally generated second sync signal so that in cooperation with synchronization of the midframe, the superframe is synchronized.

SUMMARY OF THE INVENTION

An object of the present invention is to provide still another frame synchronization system capable of operating on at least two different sync signals.

Still another object of the present invention is to provide a frame synchronization system for binary data signals including a multiframe having X superframes with each of the X superframes including M midframes with each of the M midframes including m subframes and with each of the m subframes including $x$ ports or channel times. The data signal also includes an overhead channel having overhead data including a first sync signal having a first predetermined pattern composed of Y bits disposed in adjacent ones of the M midframes and a second sync signal having a second predetermined pattern different than the first predetermined pattern composed of M bits, each of the M bits being disposed in a different one of the M midframes, where X, M, $m$, $x$ and Y are all integers greater than one.

A further object of the present invention is to provide a frame synchronization system wherein the data signal is synchronized first by synchronizing the midframes in response to the first sync signal and then synchronizing the superframe and the multiframe in response to the second sync signal with a structural relationship existing between the synchronization of the midframe and the superframe in the form of a single decision circuit and incorporating therein a mode detector and decoder circuit to control when the decision circuit responds to the results of the comparison of the first sync signal and a locally generated reference signal for the first sync signal and to the results of the comparison of the second sync signal to a locally generated second sync signal wherein the locally generated sync signal is formed by the state of the stages of the superframe counter. A mode of operation intermediate the above two modes of operation will cause the overhead data to be loaded into the superframe counter to provide an assumed error free locally generated reference signal.

A feature of the present invention is the provision of a frame synchronization system for a time division multiplex binary data signal having a multiframe including X superframes, each of the X superframes including M midframes, each of the M midframes including m subframes, each of the m subframes including $x$ ports, the data signal including an overhead channel data having at least a first sync signal having a first predetermined pattern composed of Y bits disposed in adjacent ones of the M midframes and a second sync signal having a second predetermined pattern different than the first predetermined pattern composed of M bits, each of the M bits being disposed in a different one of the M midframes, where X, M, $m$, $x$ and Y are all integers greater than one, comprising: a source of the data signal; first means coupled to the source to produce timing signals including a first reference signal for the first sync signal and a second reference signal for the second sync signal; a first digital comparator coupled to the source and the first means responsive to the data signal and the first reference signal to produce a first output signal indicative of the matches and mismatches between the data signal and the first reference signal; a second digital comparator coupled to the source and the first means responsive to the data signal and the second reference signal to produce a second output signal indicative of the matches and mismatches between the second sync signal and the second reference signal; a second means responsive to the first output signal and the second output signal in sequence to produce a first control signal and a second control signal; third means coupled between the first and second comparators and the input of the second means and to the output of the second means responsive to the second control signal to control the coupling of the first and second output signals to the input of the second means; and fourth means coupled to the first means, the first comparator, the second means and the third means responsive to the first ouput signal and the first control signal and under control of the third means to establish and maintain synchronization between the timing signals and the data signals.

Another feature of the present invention is the provision of a frame synchronization system for a time division multiplex binary data signal having a multiframe including X superframes, each of the X superframes including M midframes, each of the M midframes including $m$ subframes, each of the $m$ subframes including $x$ ports, the data signal including an overhead data channel having a first sync signal having a first predetermined pattern composed of Y bits disposed in adjacent ones of the M midframes and one of a second sync signal and a third sync signal, the second sync signal having a second predetermined pattern different than the first predetermined pattern composed of M bits, each of the M bits being disposed in a different one of the M midframes, and the third sync signal being the complement of the second sync signal, where X, M. $m$, $x$ and Y are all integers greater than one, comprising: a source of the data signal; first means coupled to the source to produce timing signals including a first reference signal for the first sync signal and a second reference signal for the second and third sync signals; a first digital comparator coupled to the source and the first means responsive to the data signal and the first reference signal to produce a first output signal indicative of the matches and mismatches between the data signal and the first reference signal; a second digital comparator coupled to the source and the first means responsive to the data signal and the second reference signal to produce a second output signal indicative of the matches and mismatches between one of the second and third sync signals and the second reference signal; a second means responsive to the first output signal and the second output signal in sequence to produce a first control signal and a second control signal; third means coupled between the first and second comparators and the input of the second means and to the output of the second means responsive to the second control signal to control the coupling of the first and second output signals to the input in the second means; and fourth means coupled to the first means, the first comparator, the second means and the third means responsive to the first output signal and the first control signal and under control of the third means to establish and maintain synchronization between the timing signals and the data signal.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
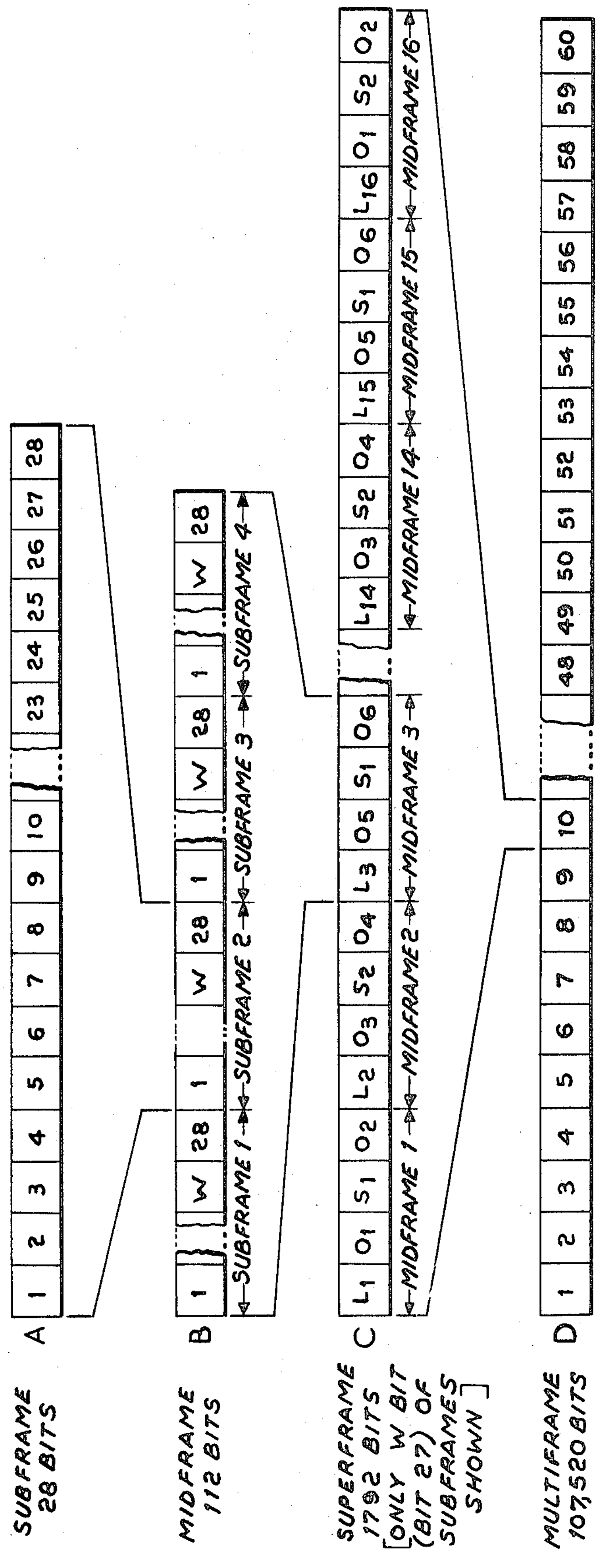
FIG. 1 illustrates the format of the data signal upon which the frame synchronization system of the present invention operates.

In the following description certain specific values for X, M, $m$, $x$ and Y are given as are certain frequencies and other parameters. These specific values are not to be considered as a limitation to the scope of the invention, but are merely for the purposes of explaining the operation of the frame synchronization system in accordance with one actual reduction to practice. It will be well within the skill of one skilled in the art to modify these parameters to meet the requirements of a different set of specifications. In addition, the frame synchronization system of the present invention will be described, solely for the purpose of illustration, as it is employed in an asynchronous digital communication system. The principles and techniques set forth in this description may be used in other types of digital communication systems having very lengthy TDM formats and in systems where a small percentage of the bit rate may be allotted for sync bits.

An asynchronous digital communications system contains two separate, independent functional units, namely a multiplexer and demultiplexer.

The multiplexer accepts 16 asynchronous data input channels and 16 order-wire channels and multiplexes them into a synchronous 34.4 Mbps (megabits per second) output stream. The actual design frequency for the oscillator is 34.415 Mbps ± 10 ppm (parts per million), but as referred to as 34.4 Mbps for the sake of convenience. This frequency is somewhat higher than that required if all the input frequencies were exact to allow for a stuff only asynchronous combining system. Included in the output stream is an overhead channel or port that contains framing and bit stuffing information. The system is designed so that a 38.4 Kbps (kilobits per second) digital stream can be inserted into the multiplexer in the place of a digitized voice frequency channel. The digital signal is processed as a synchronous signal in the multiplexer.

The acceptable simultaneous asynchronous input rates are in four groups of related bit rates as illustrated in TABLE I presented hereinbelow.

TABLE I

MASTER GROUP MULTIPLEXER INPUT RATES

| MULTIGROUP | RATES IN Mbps |
|---|---|
| 1 | 4.9152, 2.4576 |
| 2 | 1.536, 0.768, 0.384, 0.192 |
| 3 | 1.2288, 0.6144, 0.3072, 0.1536 |
| 4 | 0.576 |
| Overhead | 16 Voice channels each of which can be replaced with a 38.4Kbps data channel |

The 16 asynchronous inputs are synchronized to the synchronous data stream output in the multiplexer by fixed and variable bit stuffing the input signals up to a synchronous rate prior to multiplexing. The communication system use synchronous channels of 1.2288 Mbps. Only the 576 Kbps requires fixed stuffing. The stuffed bits are removed at the demultiplexer by sensing a channel control word which tags each transmitted stuffed bit. The removal of stuffed bits causes a jittery channel clock which is smoothed by a clock smoother.

All the voice frequency orderwire channels are digitally encoded prior to multiplexing by one six bit 38.4 Kbps PCM (pulse code modulation) circuit. This circuit is a nonlinear coder with a companding ratio of 20 to 1, providing a 29 db (decibel) (theoretical 22 db) signal-to-quantizing distortion for a 0 dbm (decibel referred to 1 milliwatt). The characteristics of the digital asynchronous communication system are (1) a bit efficiency greater than 95 percent, (2) a stuff only system, (3) a bit integrity greater than $10^{14}$ bits at $10^{-3}$ error rate, (4) a full duplex system and (5) an elastic store of 4 bits sufficient for multiplexing and demultiplexing. Each multigroup will accept up to four bits at the frequencies listed for that group in TABLE I.

Referring to FIG. 1, there is illustrated therein the format arrangement for the data stream in accordance with the principles of the present invention. The format of the data stream or signal forming the input to the demultiplexer, wherein the frame synchronization system of the present invention is employed, includes X = 60 superframes included in one multiframe (Curve D, FIG. 1). Each of the superframes include M = 16 midframes (Curve C, FIG. 1) while each of the midframes include $m = 4$ subframes (Curve B, FIG. 1). Each of the $m$ subframes include $x$ = 28 ports or channel times (Curve A, FIG. 1). The format insures that when synchronized the timing sequencers in the multigroup circuitry completes one complete cycle between the system synchronizing resets. The overhead data channel indicated as port W in Curve B, FIG. 1 is port 27 and is used so that port 28 may be used for port timing to multigroup one to reduce format jitter. Curve C, FIG. 1 illustrates only the W bits (bit 27) of the midframes with the symbols employed therein being $O_N$ equals the orderwire data word, one six bit word per three midframes, two bits per midframe, where N = 1, 2, 3, 4, 5 or 6, there being three variations in the superframe one of which is illustrated in FIG. 1;

$S_N$ equals the short sync code bits, which repeats 1010 . . . pattern every two midframes, where N = 1 or 2;

$L_N$ equals the long sync code bits, 16 bits per superframe, one bit in each of the 16 midframes per superframe, where N = 1, 2, 3, 4, 5, 6, 7, 8, 9, 10, 11, 12, 13, 14, 15 or 16; and $C_N$ equals the stuff control word, bits one to thirteen of the long sync bits, where N = 1, 2, 3, 4, 5, 6, 7, 8, 9, 10, 11, 12 or 13.

Each of the superframes contains (1) one 13 bit stuff control word (the first 13 bits of the 16 long sync code bits), (2) 16 short sync code bits, (3) 16 long sync code bits and (4) 5⅓ six bit orderwire data words. It should be noted that the long sync code word and the stuff control word are combined. Previous designs employed 16 bits in the superframe for stuff control and long sync with the bits divided between the two functions. In the present system all the 16 bits are employed for the long sync information and the first 13 bits thereof for the stuff control word. The format as illustrated in FIG. 1 aids in synchronization of the demultiplexer and minimizes the hardware employed in the frame synchronization system.

The symbols set forth hereinabove and illustrated in Curve C, FIG. 1, are also employed in FIGS. 3A–3D and FIG. 10 and have the same meaning in these other Figures.

As mentioned hereinabove the stuff control code is contained in the first 13 bits of the 16-bit long sync word which represents the state of the superframe counter at the multiplexer. The bits representing the states of the counter are directly multiplexed into the overhead channel when a no stuff action is desired. When stuffing is required at least the bits representing the state of the first two stages of the superframe counter of the multiplexer are complemented prior to multiplexing. If the demultiplexer receives the complemented first two bits of the long sync code word the demultiplexer knows that it is required to perform a destuff operation. It has been found, however, that the hardware of the frame synchronization system is minimized and sync is accomplished more reliably, if when stuffing is required the state of all the stages of the superframe counter of the multiplexer are complemented prior to multiplexing. Because of this, the long sync code comparator will give a match indication on either the normal long sync code word or the complemented long sync code word, with the match indication in the latter situation being used to indicate that a destuff operation is required of the demultiplexer.

The variable stuff command words are allocated on a superframe level as shown in TABLE II presented hereinbelow with one stuff command per superframe. Stuff commands for a given multigroup enter the multigroup on a single lead and the stuff command sequencer in the multigroup allocates the stuff command in sequence to each of the four groups per multigroup.

Next, consider the number of stuff control commands sent per multiframe. Since in the arrangement of the present invention, the number of stuffs per multiframe is not changed when the system operates at one-half, one-fourth or one-eighth the nominal rate, the problem is considerably simplified. Multigroup 1, which handles the four 4.9152 Mbps groups, has 32 stuffs per multiframe as seen in TABLE II. This corresponds to 8 stuffs per group per multiframe. Multigroup 2, which handles the four 1.536 Mbps groups has 8 stuffs per multiframe as shown in TABLE II which corresponds to 2 stuffs per group per multiframe. Multigroup 3, which handles the four 1.2288 Mbps groups, has 8 stuffs per multiframe as illustrated in TABLE II, or 2 stuffs per group per multiframe. Multigroup 4, which handles the four 576Kbps groups, has 4 stuffs per multiframe as illustrated in TABLE II, or one stuff per group per multiframe. In summary the system in which the present invention is employed has been designed so that the number of stuff per group per multiframe is an integer for all the group rates that have to be handled.

The fact that the number of stuffs and bits for each group per multiframe is an integer makes it possible to synchronize the system to the multiframe with a reset pulse which resets all the group timing sequencers, stuff command sequencers and group dividers at a specific point in the multiframe and is a practical means by which the system state is tied to the multiframe. The reset pulse corrects for initialization which may cause a difference to appear between the system state and the multiframe counter state.

The data format of FIG. 1 illustrates that bit 27 of the subframe was selected as the overhead port bit instead of bit 28 which is now a 4.9152 Mbps port bit. The length of the multiframe was selected to give each of the 576 Kbps groups a chance to be stuffed in one multiframe. This insures that the four stuff command sequencers have cycled at least once per midframe and simplifies the system reset. The stuff control word is 13 bits per superframe and there are 16 long sync bits per superframe. The 16 long sync bits include the 13 stuff control word bits and three additional bits. This format makes the framing employing the frame synchronization system of the present invention less susceptible to errors and easier to locate synchronized conditions.

The input group signals are multiplexed into the data stream format as illustrated in TABLE III presented hereinbelow.

TABLE II.—VARIABLE STUFF COMMAND ALLOCATION

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Multigroup rate | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
| 4.9152 Mbps | X | | X | | X | | X | X | | X | | X | | X | X | | X | | X | | X | X | | X | | X | | X | | |
| 1.536 Mbps | | X | | | | | | | X | | | | | | | X | | | | | | | X | | | | | | | |
| 1.2288 Mbps | | | | X | | | | | | | X | | | | | | | X | | | | | | | X | | | | | |
| 0.576 Mbps | | | | | | X | | | | | | | | | | | | | | X | | | | | | | | | | |
| Not used | | | | | | | | | | | | | X | | | | | | | | | | | | | | | X | X | X |

TABLE III.—PORT TIMING ALLOCATION TO MULTIGROUPS

| Multigroup rate | No. or ports allocated | Subframe count 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|
| 4.9152 Mbps | 16 | X | | X | | X | | X | X | | X | | X | | X | X | | X | | X | | X | X | | X | | X | | X |
| 1.636 Mbps | 5 | | X | | | | | | | X | | | | X | | | X | | | | | | | X | | | | | |
| 1.2288 Mbps | 4 | | | | X | | | | | | | X | | | | | | | X | | | | | | | X | | | |
| 0.576 Mbps | 2 | | | | | | X | | | | | | | | | | | | | | X | | | | | | | | |
| Overhead | 1 | | | | | | | | | | | | | | | | | | | | | | | | | | | X | |

Figure 2:
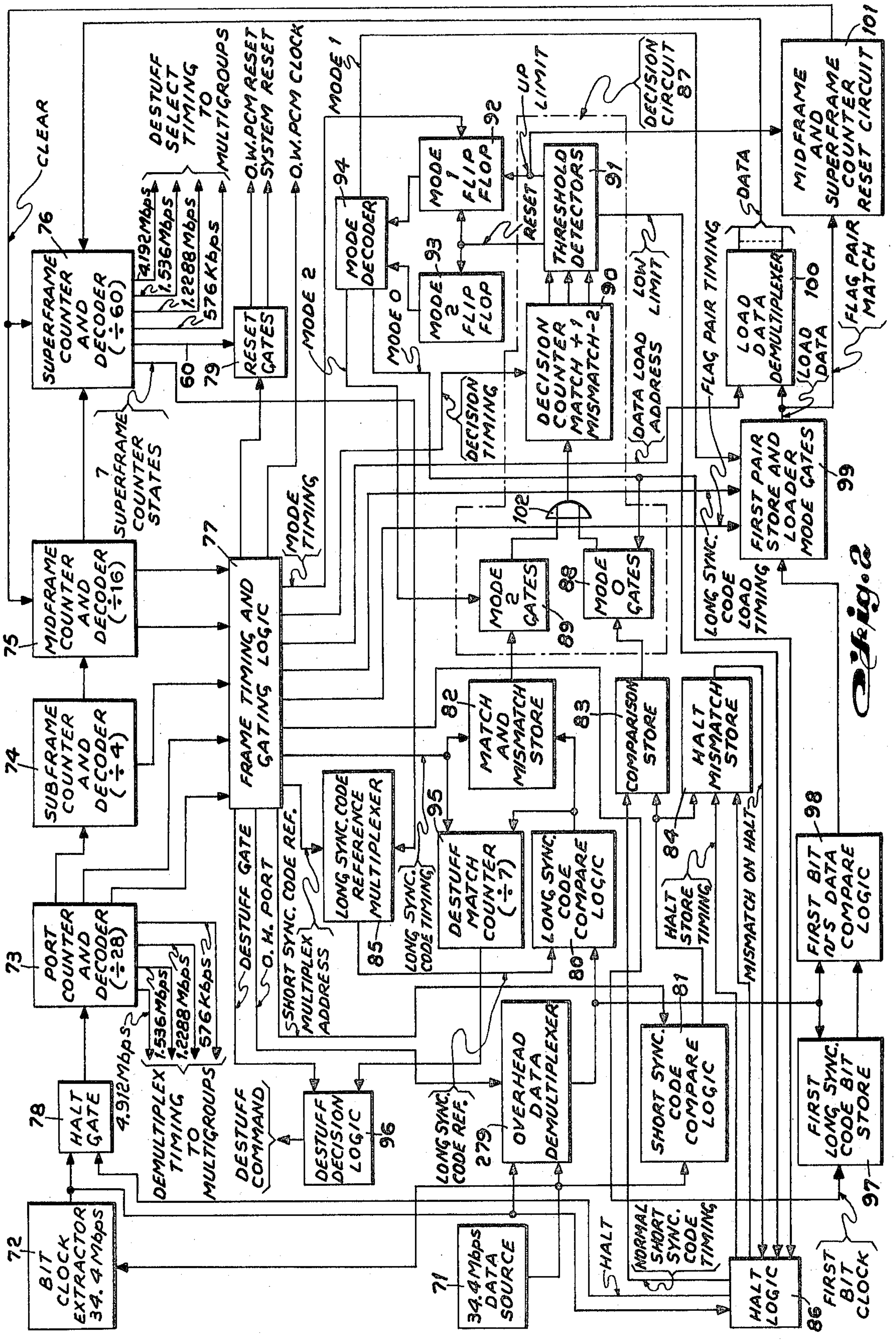
FIG. 2 is a block diagram of one embodiment of the frame synchronization system in accordance with the principles of the present invention.

Referring to FIG. 2, there is illustrated therein in block diagram form the frame synchronization system operating in accordance with the principles of the present invention using the data stream format of FIG. 1.

The frame synchronization system of FIG. 2 is employed in the demultiplexer of the asynchronous digital communication system and provides the timing and gating required to demultiplex the master group data. Inputs to the circuit of FIG. 2 are the 34.4 Mbps data from source 71 and the bit clock at a 34.4 Mbps rate extracted from the data of source 71 by bit clock extractor 72. A cascade connection of port counter and decoder 73, superframe counter and decoder 74, midframe counter and decoder 75 and superframe counter and decoder 76 together with the frame timing and gating logic 77 define the channels or ports, the subframes, the midframes and the superframes as well as various other timing signals required for the operation of the frame synchronization system of the present invention. The counters and decoders 73, 74, 75 and 76 are controlled by means of HALT gate 78 controlled by a signal derived from the frame synchronization system to render the phase of the various timing signals in phase with the data of the bit stream from source 71 and, thus, the timing signals present at the multiplexing end of the digital communication system.

Port counter and decoder 73 includes a port counter which is a high speed synchronous divide-by-28 counter whose state sequence is specially selected to require minimum decoding for the four demultiplex timing outputs to the multigroups. Minimum decoding means the least propagation delay in the decoder to avoid excessive timing skew. These outputs define the particular bits in the 34.4 Mbps data stream which are to be demultiplexed to each multigroup. It also defines the timing of the overhead data port which contains the synchronization information or signals and the port counter may be halted through means of gate 78 by the framing logic for synchronization.

Subframe counter and decoder 74 includes a subframe counter in the form of a binary divide-by-four counter used primarily to identify the function of demultiplexed data from the overhead channel. It is offset by one state from the subframe counter in the multiplexer to allow a one period delay in the multiplexing process. Thus, subframe 1 identifies long sync bits; subframe 2 defines orderwire bits; subframe 3 defines short sync bits and subframe 4 defines orderwire bits. In addition to data identification, the subframe counter provides timing for PCM orderwire clock, partial timing for 576 Kbps fixed stuff logic, system and PCM reset, destuff command and destuff advance. The end of a subframe cycle clocks a midframe counter incorporated in midframe counter and decoder 75.

The midframe counter of counter and decoder 75 defines the 16 bits which should be used for the framing circuit as long sync and stuff control words. The even counts form the local short sync reference. Midframes, 1, 2, 14 and 16 define the timing of the superfame counter, flag pair, destuff command, and system and PCM reset, respectively.

In addition, midframe counter states are used to address the long sync reference multiplexer and the load data demultiplexer as described hereinbelow. This counter is set to the zero state as part of the long sync loading portion of the framing cycle.

Superframe counter and decoder 6 includes a superframe counter having a count of 60 which defines the midframe period. The decoded outputs from the superframe counter select the multigroup which may be destuffed during the superframe. Superframe 60 is decoded to provide timing for reset gates 79 for the system and PCM reset functions. The reset functions guarantee that all multigroup and PCM counters are synchronized to the common control reference. The superframe counter is cleared and set to the long sync code received in source 71 as part of the framing cycle.

As previously mentioned the short sync code is a repeated binary 0,1 pattern with one sync bit every 112 data bits, or 1 sync bit per midframe. Synchronization of the demultiplexer to the short sync code correctly phases the port and subframe counters, locates the PCM orderwire data, and identifies the odd and even bits of the long sync and stuff control word.

The long sync and stuff control word is a series of 16 bits having the form 01, AA, BB, CC, DD, EE, FF, GG; or 10, $\overline{AA}$, $\overline{BB}$, $\overline{CC}$, $\overline{DD}$, $\overline{EE}$, $\overline{FF}$, $\overline{GG}$. The first form of the code word is used when no destuff action is desired while the second form of the code word is employed when destuffing is required. Long sync bits occur every 112 data bits and the long sync code word is completed in 16 midframes or one per superframe.

The frame synchronization system for the master group demultiplexer in accordance with the principles of the present invention includes an overhead data demultiplexer 279; long sync and short sync match circuits including the long sync code compare logic 80, short sync code compare logic 81, match and mismatch store 82, comparison store 83, halt mismatch store 84, long sync reference multiplexer 85 and half logic 86; decision circuit 87 including mode 0 gates 88, mode 2 gates 89, decision counter 90 and threshold detectors 91; mode control logic including mode 1 flip flop 92, mode 2 flip flop 93 and mode decoder 94; destuff control logic including destuff match counter 95 and destuff decision logic 96; and a long sync loader including the first long sync bit store 97, first bit versus data compare logic 98, flag pair store and loader mode gates 99, load data demultiplexer 100 and midframe and superframe counter reset circuit 101.

Overhead data demultiplexer 279 operates on every twenty-seventh bit of the 34.4 Mbps input data stream which carries overhead data, for instance, short sync, long sync or PCM orderwire data. This data is removed from the high speed stream under control of the overhead port timing and routed to the long sync compare logic 80 and the first bit store 97. In addition, the overhead data is routed to the PCM orderwire card (not shown) to demultiplex the orderwire data.

Long sync code compare logic 80 receives inputs from overhead data demultiplexer 279 and the long sync reference multiplexer 85. This circuit is EXCLUSIVE-NOR logic which produces a binary 1 when the long sync data bit and the long sync reference bit are matched and a binary 0 if they are mismatched. The match conditions are clocked into the match store of store 82 and the mismatch conditions into the mismatch store of store 82 under control of the long sync timing. Once each superframe the match and mismatch stores of store 82 are examined to determine whether the 16 bit long sync code word matched or mismatched the 16 bit long sync reference word. Two match conditions and one mismatch condition are possible when the entire long sync word is considered. If every overhead long sync bit matched its reference bit, a match is fed through gates 89 to decision counter 90. This is the condition when the long sync word is transmitted with a no-stuff control signal. When every overhead long sync bit mismatches its reference bit, decision counter 90 receives a match signal. This indicates that the long sync word was received with no errors, but contained a destuff control signal. In any other case a mismatch is fed through gate 89 to decision counter 90.

Short sync code compare logic 81 receives its input from source 71 and the short sync code reference from the first stage of the midframe counter of counter and decoder 75 through logic 77. Normal short sync timing identifying port 27 clocks the match or mismatch from the EXCLUSIVE-NOR logic once per midframe into comparison store 83. The contents of store 83 are directly fed to the decision counter 90 through mode 0 gates 88 when the synchronization system is in a mode 0 operating condition.

In mode 0 if counter 90 senses too many mismatches in the output of store 83, counter 90 goes below threshold and the next short sync sample is checked by the halt mismatch store 84. A mismatch detected at this time generates a HALT signal from halt logic 86 which is coupled to halt gate 78. Gate 78 inhibits the counting cycle of the counter of counter and decoder 73 causing a change in counter phase relative to the incoming data of source 71. At the same time, successive bits of the input data stream are checked in the halt mismatch store 84 until a match is found. The halt signal is then stopped, gate 78 is activated, normal short sync check is resumed and the port counter cycle is continued.

Decision circuit 87 and in particular counter 90 makes statistical decisions measuring the validity of the assumed framing position, for instance, counter phase. The decision is made on the basis of the match and mismatch conditions generated from the long or short sync compare logic 80 or 81. The number of matches and mismatches is counted in an up-down counter having 32 states which is the component of counter 90. Each match causes a unit increment in the counter state of counter 90 while each mismatch causes a two unit decrement of the counter state of counter 90.

Two threshold detectors or decoders form the second portion of circuit 87. If a sufficient number of matches is detected by the compare logics 80 or 81, the upper limit detector is activated to prevent overflow of counter 90. If the framing circuits are in short sync search, mode 0, the upper limit output signal indicates an in-frame condition for the port, subframe and first stage of the midframe counter. The short sync in-frame condition causes a transfer to long sync load mode (mode 1).

A second threshold decoder or detector operates at a counter state of counter 90 chosen to compromise between fast rejection of false frame states (high threshold) and low probability of rejecting correct sync (low threshold). When the low threshold limit output is activated, it always locks counter 90 to prevent further decrementing and possible underflow. The low threshold output signal causes one of two actions in the remaining framing circuits depending on the mode control circuits.

The long sync load mode (mode 1) begins by storing the assumed first bit of the flag pair in store 97. The first and second bits are then compared for a mismatch in store and gates 99. The mismatch condition allows the midframe counter to continue its count which is used as the load address in demultiplexer 100. The load address directs the load data representing the superframe counter state to the correct flip flop of the superframe counter in superframe counter and decoder 76. If the first and second bits (flag pair) match, the midframe counter is reset; the next long sync bit is stored in store 97 as the assumed first bit; and load cycle continues as described hereinabove.

In the long sync load mode (mode 1), the flag pair will normally be located in a maximum of seven trials. It is possible, however, that no flag pair will be located and this condition must be considered. A mode 1 mismatch counter contained in decoder 94 allows up to 16 unsuccessful attempts to locate the flag pair. At this time, the mode 1 mismatch counter forces the mode circuits to enter mode 2 or long sync sense. Since the demultiplexer superframe counter is, in this case, started at state 0, the likelihood of achieving long sync is only 1 in 60 and this arbitrary long sync position, if incorrect, is rapidly rejected and a return to mode 0 or short sync search is initiated.

At the multiplexer, bits were added or stuffed into the multigroup data stream, as required, to prevent underflow in the elastic store. These bits carry no useful data and must be removed at the demultiplexer terminal. As mentioned in the format description of FIG. 1, destuff-no-destuff control condition are carried by the long sync code word. Although only one binary bit is required for a destuff-no destuff decision, error protection on this vital decision is obtained through a majority decision on the first thirteen long sync bits.

The long sync reference data is always the no destuff pattern and destuff match counter 95 counts the number of times the received long sync code word matches the local long sync code word.

In the short sync search mode (mode 0) when the counter 90 is driven from the matches and mismatches of the short sync data, a low threshold output signal from detectors 91 indicates an incorrect choice of short sync data and initiates a halt action described hereinabove. In addition, it resets counter 90 to zero.

When counter 90 is driven from the long sync match circuits, a below threshold condition indicates a loss of long sync, an incorrect choice of flag pair during the long sync load period, or a false short sync code was accepted. The framing circuits are returned to the short sync search mode (mode 0) to re-initiate the framing cycle.

Mode gates 88 and 89 at the input to counter 90 steer the output of store 83 and store 82 through OR gate 102 to counter 90 allowing it to be shared between two sync circuits.

The mode control logic includes mode 1 flip flop 92 and mode 2 flip flop 93 together with mode decoder 94 which produces output control signals which steer the framing circuits through the framing cycle. When the system is completely out-of-sync mode 0 operation is initiated and short sync match-mismatches are gated to counter 90 in an effort to locate short sync condition. When short sync is located, counter 90 through threshold detectors 91 initiates a switch to mode 1 (long sync load). At the same time, the midframe and superframe counters are cleared in preparation for loading during mode 1. The load mode lasts for an average of 24 midframes, terminating at the 16th count of the midframe counter. No decision action takes place during mode 1. The end of the superframe loading cycle initiates mode 2 operation (long sync sense) and long sync match/mismatch data drives counter 90. Synchronization is now completed and all output data is valid.

The long sync loader, operational only in mode 1, demultiplexes the long sync code word and loads it bit by bit into the demultiplex superframe counter of superframe counter and decoder 76.

As mentioned hereinabove, the long sync code word consists of 16 bits in a superframe. The first pair of bits are always complementary and are called the flag pair. They indicate the start of a long sync load sequence. The remaining seven pair of bits carry the state variables of the multiplex superframe counter.

Seven or more matches (a majority of 13) is interpreted to mean no-destuff and inhibits the destuff command. Fewer than seven matches is interpreted as meaning a destuff command should be initiated and coupled to the appropriate multigroup.

Figure 3E:
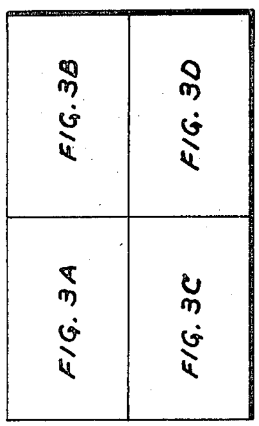
FIGS. 3A–3D when laid out according to FIG. 3E is one embodiment of the logic diagram of the frame synchronization system of FIG. 2.
FIG. 3F defines the symbols employed in FIGS. 3A–3D.
Figure 3F:
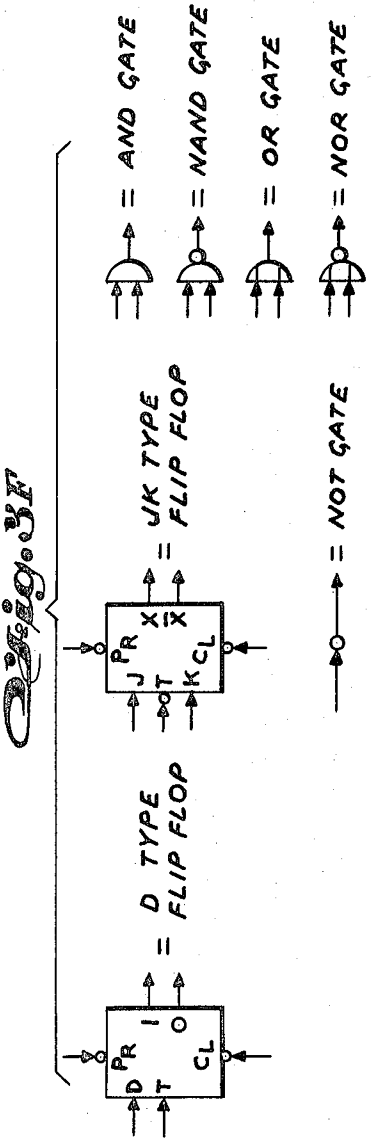

Signals 3A–3D when organized as illustrated in FIG. 3E presents a detailed logic diagram of one embodiment of the various blocks of FIG. 2 with the logic symbols being employed therein identified as illustrated in FIG. 3F.

Throughout FIGS. 3A–3D and various ones of the timing diagrams of FIGS. 4–10 there are various acronyms employed to identify the various signals which acronyms are self explanatory. Examples of these acronyms are MG = match gate, SUB = subframe, C27 = overhead port 27, S-gate = short sync gate, L = long sync reference, S match = short sync match, MID = midframe, SUP = superframe, CLR = clear and CLK = clock, M = match, MM = mismatch and the like. In addition, before certain ones of these acronyms is the prefix "1-" which indicates that the signal has a binary 1 state and the prefix "0-" which indicates that the signal has a binary 0 state.

Port counter and decoder 73 includes five JK-type flip flops A, B, C, D, and E. These five flip flops if counting normally can provide a count of 32, or division by a factor of 32. However, AND gates 103 and 104 and JK flip flop 105 are appropriately coupled to the flip flops A-E to change the count thereof to 28. NAND gates 106, 107, 108 and 109 in cooperation with AND gate 110, NAND gate 111 and NOR gate 112 provide the demultiplexing clocks for the various indicated multigroups. These latter gates are part of the decoder 73 and are the only gates shown since they deal directly with the frame synchronization system of the present invention and demultiplexer destuffing. There would also be provided other logic gates to provide timing signals for each of the ports or channel times contained in a subframe. This gate logic is not shown, since they are not directly involved in the frame synchronization system but may readily be derived from Curves B-F of FIG. 4 and the following TABLE IV.

TABLE IV

PORT COUNTER DECODING TRUTH TABLE

| | State of Flip Flops | | | | |
|---|---|---|---|---|---|
| Port | A | B | C | D | E |
| **1** | 1 | 0 | 0 | 0 | 0 |
| **2** | 0 | 1 | 0 | 0 | 0 |
| **3** | 1 | 1 | 0 | 0 | 0 |
| **4** | 0 | 0 | 1 | 0 | 0 |
| **5** | 1 | 0 | 1 | 0 | 0 |
| **6** | 0 | 1 | 1 | 0 | 0 |
| **7** | 1 | 1 | 1 | 0 | 0 |
| **8** | 1 | 0 | 0 | 1 | 0 |
| **9** | 0 | 1 | 0 | 1 | 0 |
| **10** | 1 | 1 | 0 | 1 | 0 |
| **11** | 0 | 0 | 1 | 1 | 0 |
| **12** | 1 | 0 | 1 | 1 | 0 |
| **13** | 0 | 1 | 1 | 1 | 0 |
| **14** | 1 | 1 | 1 | 1 | 0 |
| **15** | 1 | 0 | 0 | 0 | 1 |
| **16** | 0 | 1 | 0 | 0 | 1 |
| **17** | 1 | 1 | 0 | 0 | 1 |
| **18** | 0 | 0 | 1 | 0 | 1 |
| **19** | 1 | 0 | 1 | 0 | 1 |
| **20** | 0 | 1 | 1 | 0 | 1 |
| **21** | 1 | 1 | 1 | 0 | 1 |
| **22** | 1 | 0 | 0 | 1 | 1 |
| **23** | 0 | 1 | 0 | 1 | 1 |
| **24** | 1 | 1 | 0 | 1 | 1 |
| **25** | 0 | 0 | 1 | 1 | 1 |
| **26** | 1 | 0 | 1 | 1 | 1 |
| **27** | 0 | 1 | 1 | 1 | 1 |
| **28** | 1 | 1 | 1 | 1 | 1 |

Figure 4:
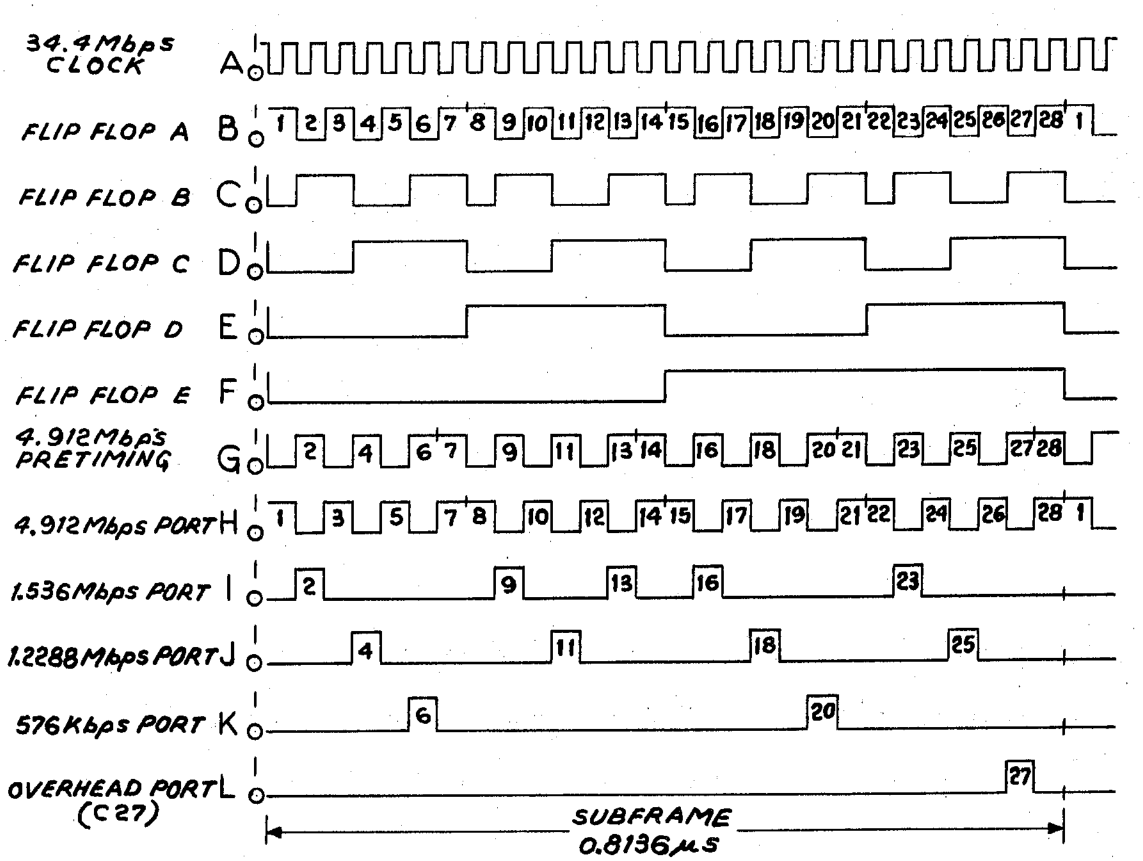
FIG. 4 is a timing diagram of the port counter and decoder of FIG. 3A.

Time demultiplexing clocks at the output of gates 106–109 are shown in Curves G-K of FIG. 4 while Curve L, FIG. 4 shows the overhead port gate or timing signal.

Figure 5:
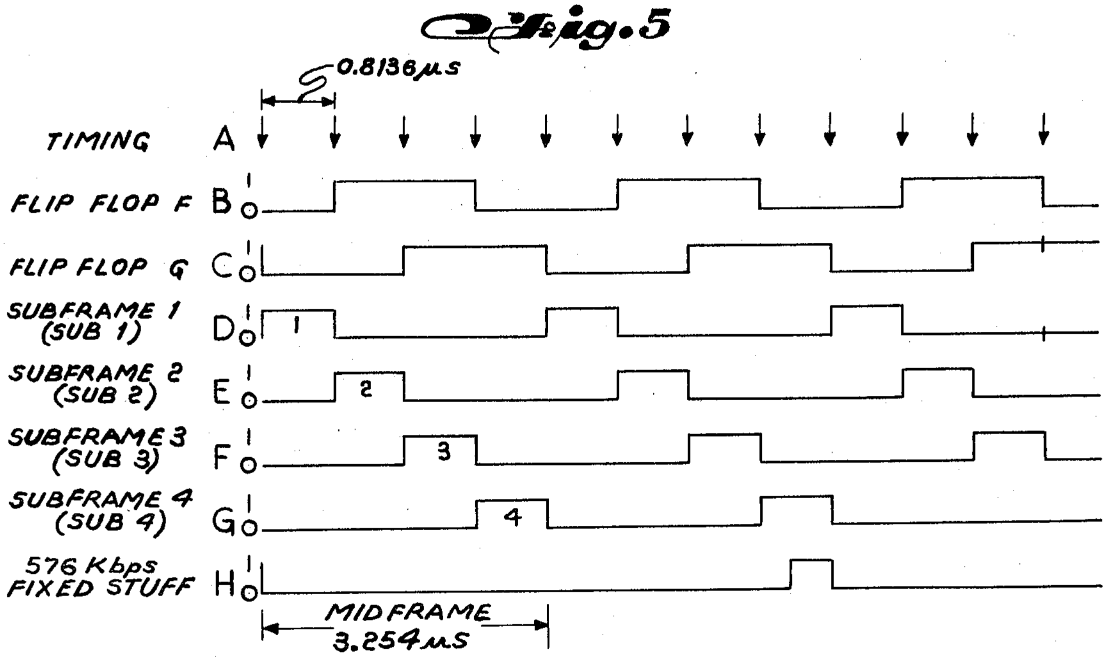
FIG. 5 is a timing diagram of the subframe counter and decoder of FIG. 3A.

Subframe counter and decoder 74 includes therein two JK-type flip flops F and G the outputs of which are employed to produce other of the necessary timing signals at the output of the decoder 74 as well as signals employed in frame timing and gating logic 77 whose gates produce the various other designated timing signals necessary for the operation of the frame synchronization system of this invention are illustrated in the dotted block labeled 77. Since only four subframes must be identified there is no necessity of changing the normal count of the two flip flop stages F and G since these two flip flop stages will provide gate signals necessary to identify the four subframes involved in the format. As in the case of counter and decoder 73 the gates necessary to provide the subframe timing signals or gates are not illustrated but may readily be derived from TABLE V below and Curves B and C, FIG. 5 with the resultant subframe timing signals or gates being illustrated in Curves D-G, FIG. 5. Curve H, FIG. 5 illustrates the 576Kbps fixed stuff timing signal produced by NAND gate 191.

TABLE V

SUBFRAME COUNTER DECODING TRUTH TABLE

| Subframe | State of Flip Flops G | F |
|---|---|---|
| 1 | 0 | 0 |
| 2 | 0 | 1 |
| 3 | 1 | 0 |
| 4 | 1 | 1 |

Figure 6:
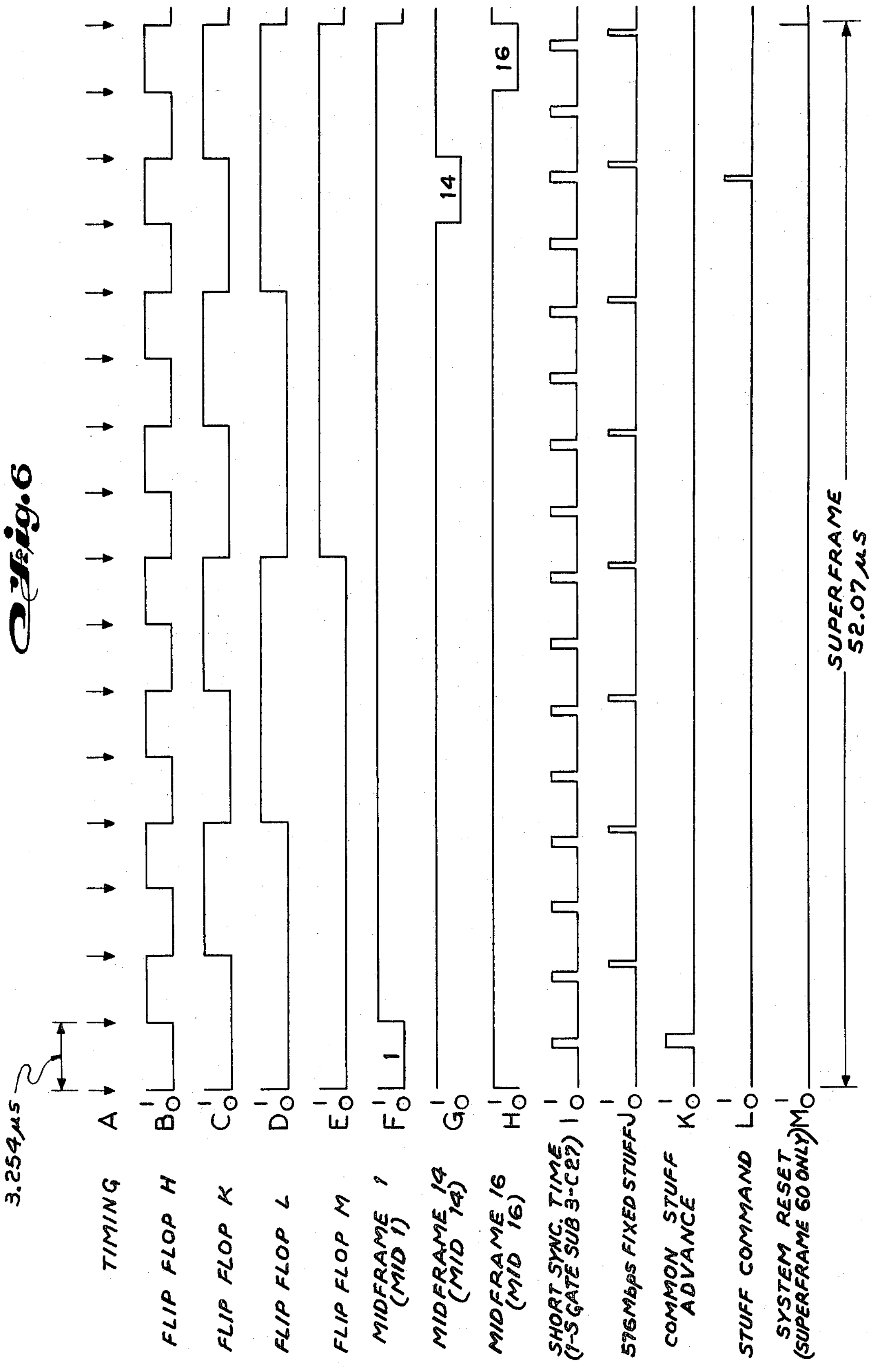
FIG. 6 is a timing diagram of the midframe counter and decoder and certain ones of the gates produced by the frame timing and gating logic of FIGS. 3A and 3B.

Midframe counter and decoder 75 is provided by four stages of JK-type flip flops identified as H, K, L and M which may be an integrated circuit module SN 74161 produced by Texas Instruments, Inc. Here again the four flip flop stages are all that is required to identify the 16 midframes by appropriate use of logic gates to meet the requirements set forth in TABLE VI and as can be derived from Curves B-H of FIG. 6 with timing signals or gates for midframes 1, 14 and 16 being illustrated in Curves F, G and H, FIG. 6. Curve J, FIG. 6 illustrates the 576 Kbps fixed stuff timing in a superframe produced by NAND gate 191, Curve K, FIG. 6 illustrates the common stuff advance produced by AND gate 192, Curve L, FIG. 6 illustrates the stuff command produced by NAND gate 177 and Curve M illustrates the system reset pulse produced by AND gate 189.

TABLE VI

MIDFRAME COUNTER DECODING TRUTH TABLE

| Midframe | State of the Flip Flops M | L | K | H |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |

Superframe counter and decoder 76 includes seven JK-type flip-flop stages N, P, Q, R, S, U and W which normally can count to 128, or divide by a factor of 128. However, the count of these seven flip flop stages are modified by the gating arrangement including AND gates 113, 114 and 115, OR gate 116, NAND gates 117 and 118, AND 119 and NOT gate 120 to count to 60.

Figure 7:
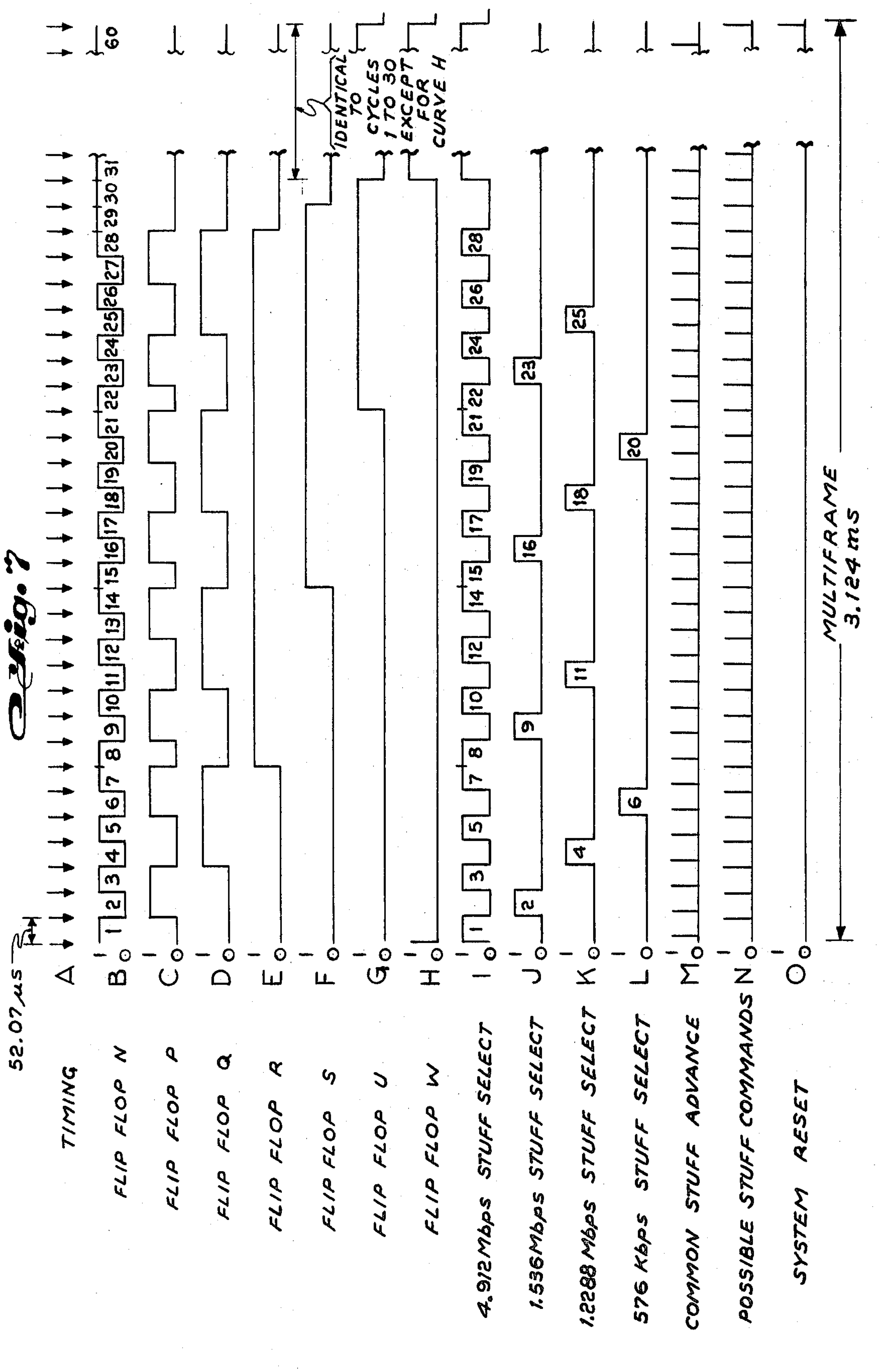
FIG. 7 is a timing diagram of the superframe counter and decoder of FIG. 3B.

NAND gates 121, 122, and 123 and AND gates 124, 125, 126, 127, 128, 129 and 130 generate the destuff select clocks for each of the identified multigroups as illustrated in Curves I, J, K and L, FIG. 7.

As in the previous counters and decoders flip flop stages N, P, Q, R, S, U and W may be employed to generate the superframe timing signal gates through the use of appropriate logic gates as derived from TABLE VII and the Curves B-H, FIG. 7. Curve M, FIG. 7 illustrates the common stuff advance timing signals produced by AND gate 192 in a multiframe, Curve N, FIG. 7 illustrates possible stuff command signals produced by NAND gate 177 and Curve O, FIG. 7 illustrates the system reset pulse produced by AND gate 189.

TABLE VII

SUPERFRAME COUNTER DECODING TRUTH TABLE

| Superframe | State of Flip-Flops W | U | S | R | Q | P | N |
|---|---|---|---|---|---|---|---|
| 1 | 0 | 0 | 0 | 0 | 0 | 0 | 1 |
| 2 | 0 | 0 | 0 | 0 | 0 | 1 | 0 |
| 3 | 0 | 0 | 0 | 0 | 0 | 1 | 1 |
| 4 | 0 | 0 | 0 | 0 | 1 | 0 | 0 |
| 5 | 0 | 0 | 0 | 0 | 1 | 0 | 1 |
| 6 | 0 | 0 | 0 | 0 | 1 | 1 | 0 |
| 7 | 0 | 0 | 0 | 0 | 1 | 1 | 1 |
| 8 | 0 | 0 | 0 | 1 | 0 | 0 | 1 |
| 9 | 0 | 0 | 0 | 1 | 0 | 1 | 0 |
| 10 | 0 | 0 | 0 | 1 | 0 | 1 | 1 |
| 11 | 0 | 0 | 0 | 1 | 1 | 0 | 0 |
| 12 | 0 | 0 | 0 | 1 | 1 | 0 | 1 |
| 13 | 0 | 0 | 0 | 1 | 1 | 1 | 0 |
| 14 | 0 | 0 | 0 | 1 | 1 | 1 | 1 |
| 15 | 0 | 0 | 1 | 1 | 0 | 0 | 1 |
| 16 | 0 | 0 | 1 | 1 | 0 | 1 | 0 |
| 17 | 0 | 0 | 1 | 1 | 0 | 1 | 1 |
| 18 | 0 | 0 | 1 | 1 | 1 | 0 | 0 |
| 19 | 0 | 0 | 1 | 1 | 1 | 0 | 1 |
| 20 | 0 | 0 | 1 | 1 | 1 | 1 | 0 |
| 21 | 0 | 0 | 1 | 1 | 1 | 1 | 1 |
| 22 | 0 | 1 | 1 | 1 | 0 | 0 | 1 |
| 23 | 0 | 1 | 1 | 1 | 0 | 1 | 0 |
| 24 | 0 | 1 | 1 | 1 | 0 | 1 | 1 |
| 25 | 0 | 1 | 1 | 1 | 1 | 0 | 0 |
| 26 | 0 | 1 | 1 | 1 | 1 | 0 | 1 |
| 27 | 0 | 1 | 1 | 1 | 1 | 1 | 0 |
| 28 | 0 | 1 | 1 | 1 | 1 | 1 | 1 |
| 29 | 0 | 1 | 1 | 0 | 0 | 0 | 1 |
| 30 | 0 | 1 | 0 | 0 | 0 | 0 | 1 |
| 31 | 1 | 0 | 0 | 0 | 0 | 0 | 1 |
| 32 | 1 | 0 | 0 | 0 | 0 | 1 | 0 |
| 33 | 1 | 0 | 0 | 0 | 0 | 1 | 1 |
| 34 | 1 | 0 | 0 | 0 | 1 | 0 | 0 |
| 35 | 1 | 0 | 0 | 0 | 1 | 0 | 1 |
| 36 | 1 | 0 | 0 | 0 | 1 | 1 | 0 |
| 37 | 1 | 0 | 0 | 0 | 1 | 1 | 1 |
| 38 | 1 | 0 | 0 | 1 | 0 | 0 | 1 |
| 39 | 1 | 0 | 0 | 1 | 0 | 1 | 0 |
| 40 | 1 | 0 | 0 | 1 | 0 | 1 | 1 |
| 41 | 1 | 0 | 0 | 1 | 1 | 0 | 0 |
| 42 | 1 | 0 | 0 | 1 | 1 | 0 | 1 |
| 43 | 1 | 0 | 0 | 1 | 1 | 1 | 0 |
| 44 | 1 | 0 | 0 | 1 | 1 | 1 | 1 |
| 45 | 1 | 0 | 1 | 1 | 0 | 0 | 1 |
| 46 | 1 | 0 | 1 | 1 | 0 | 1 | 0 |
| 47 | 1 | 0 | 1 | 1 | 0 | 1 | 1 |
| 48 | 1 | 0 | 1 | 1 | 1 | 0 | 0 |
| 49 | 1 | 0 | 1 | 1 | 1 | 0 | 1 |
| 50 | 1 | 0 | 1 | 1 | 1 | 1 | 0 |
| 51 | 1 | 0 | 1 | 1 | 1 | 1 | 1 |
| 52 | 1 | 1 | 1 | 1 | 0 | 0 | 1 |
| 53 | 1 | 1 | 1 | 1 | 0 | 1 | 0 |
| 54 | 1 | 1 | 1 | 1 | 0 | 1 | 1 |
| 55 | 1 | 1 | 1 | 1 | 1 | 0 | 0 |
| 56 | 1 | 1 | 1 | 1 | 1 | 0 | 1 |
| 57 | 1 | 1 | 1 | 1 | 1 | 1 | 0 |
| 58 | 1 | 1 | 1 | 1 | 1 | 1 | 1 |
| 59 | 1 | 1 | 1 | 0 | 0 | 0 | 1 |
| 60 | 1 | 1 | 0 | 0 | 0 | 0 | 1 |

Figure 3A:
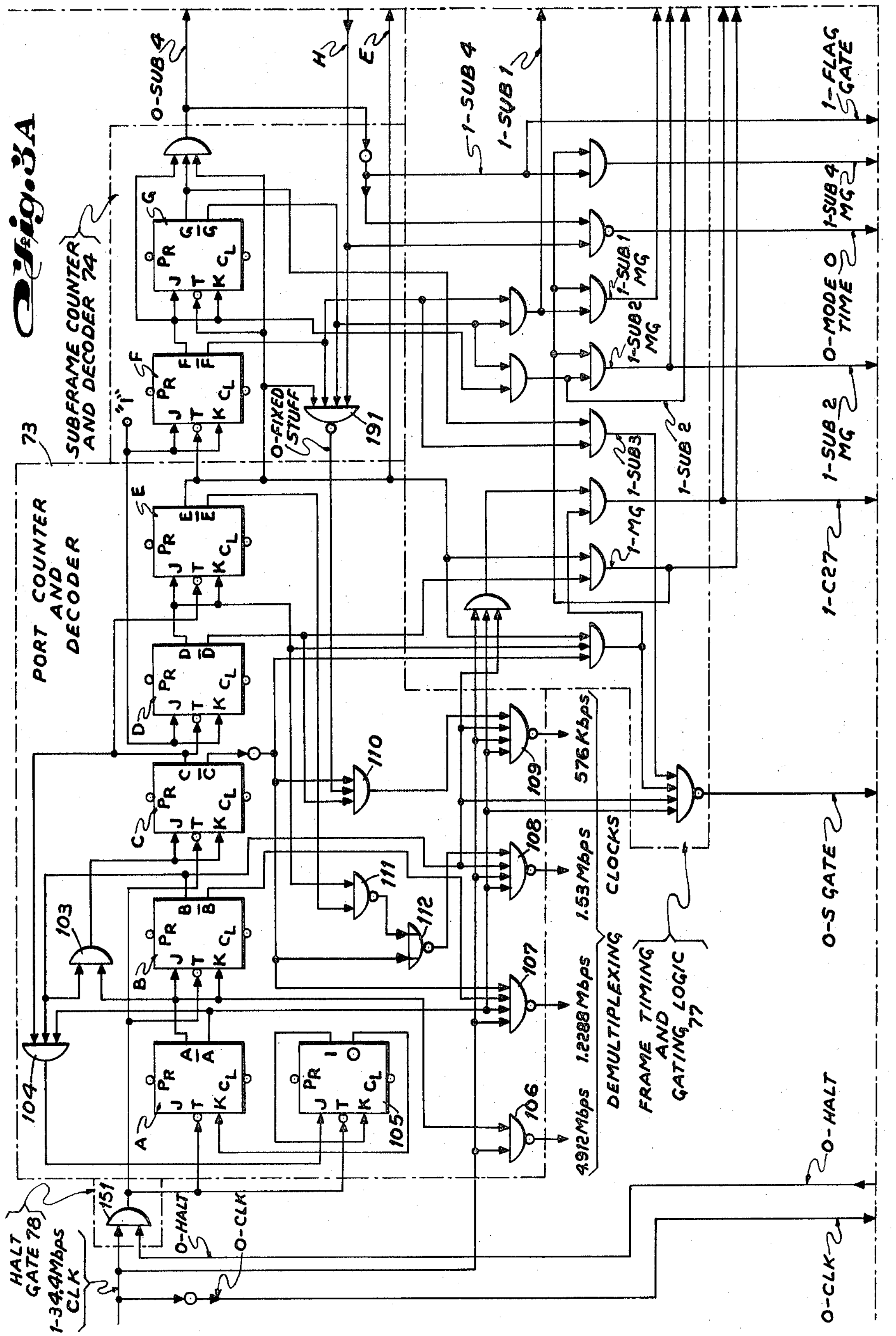
Figure 3B:
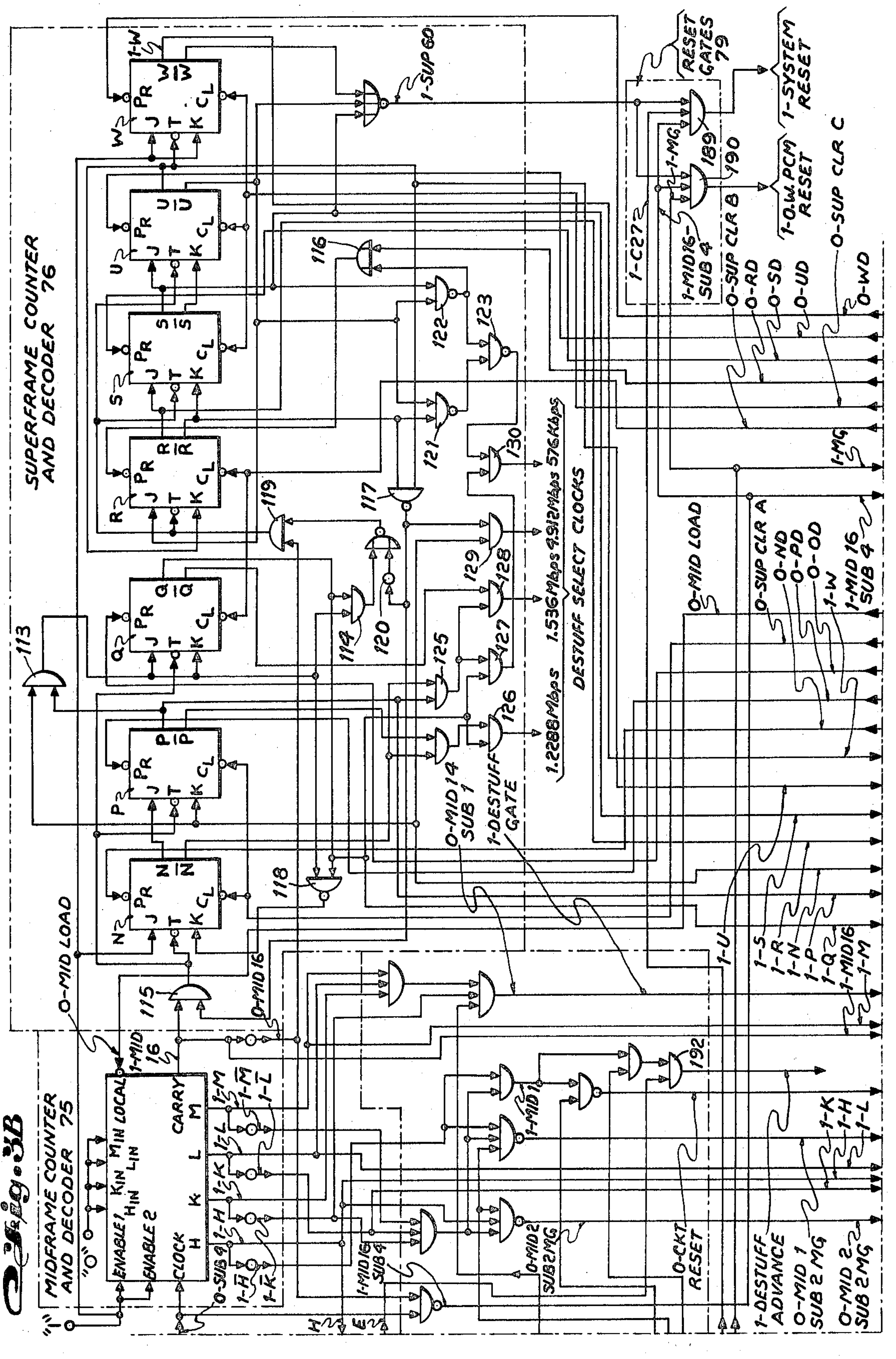
Figure 3C:
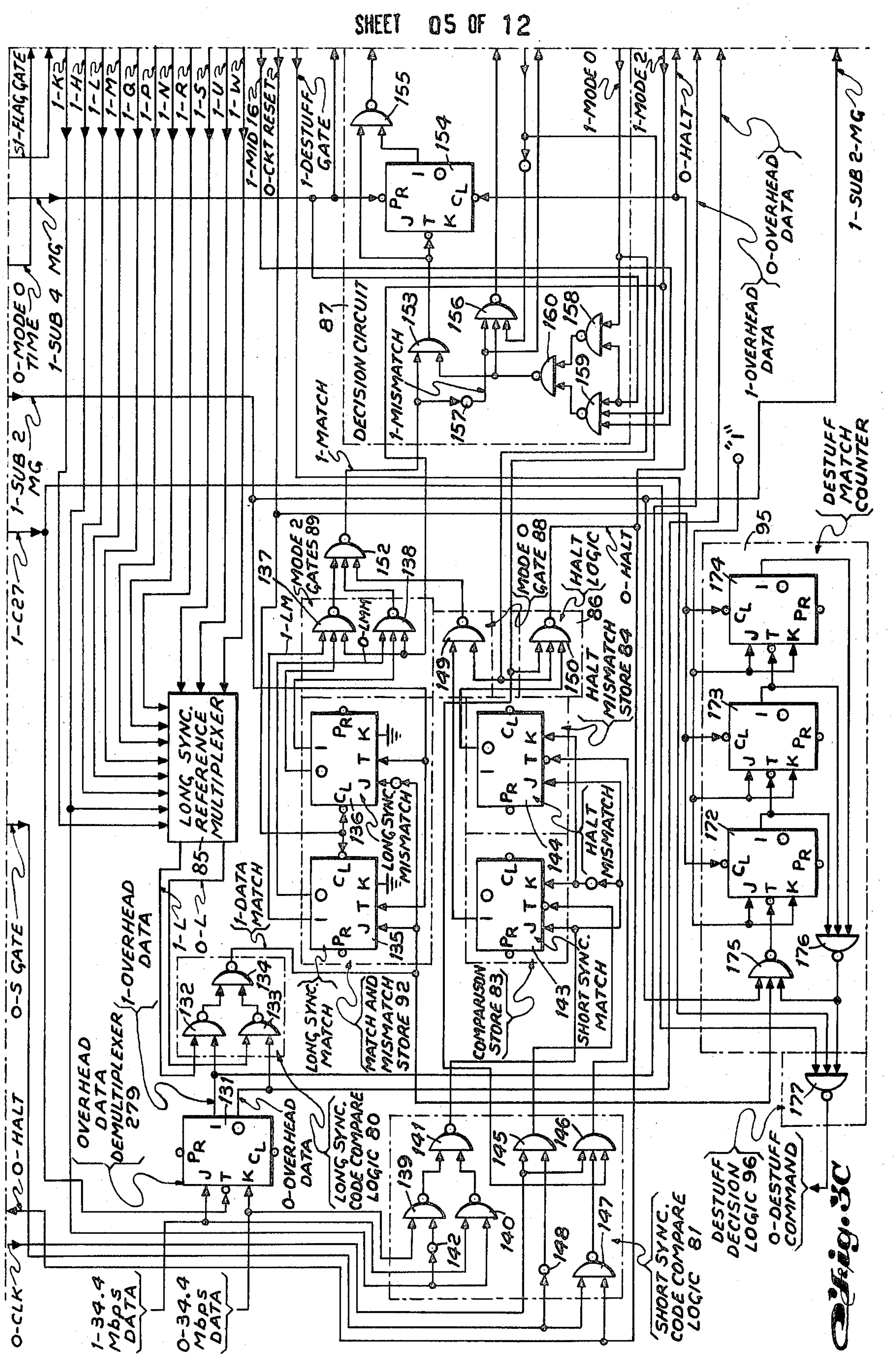
Figure 3D:
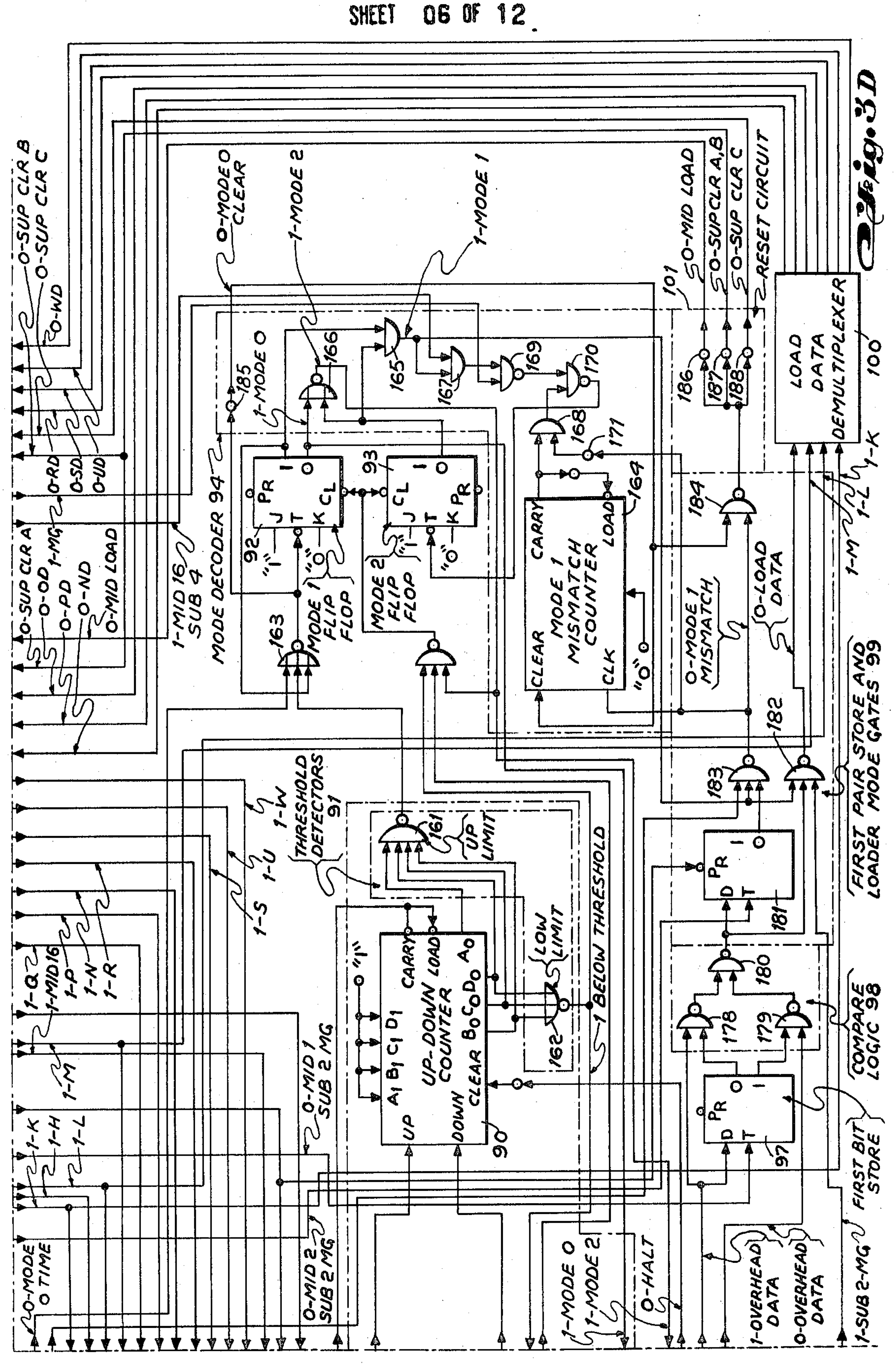

As illustrated in FIG. 3C overhead data demultiplexer 279 is provided by a JK flip flop 131. The long sync code compare logic as mentioned hereinabove with respect to FIG. 2 is EXCLUSIVE NOR logic comprising NAND gates 132, 133 and 134. NAND gate 132 is connected to the 1 output of flip flop 131 and receives as the second reference signal the 1–L output of multiplexer 85 and NAND gate 133 is connected to the 0 output of flip flop 131 and receives as the second reference signal the 0–L output of multiplexer 85. Match and mismatch store 92 is composed of two JK flip flops 135 and 136. Mode 2 gates 89 includes two NAND gates 137 and 138.

Short sync code compare logic 81 includes EXCLUSIVE NOR logic including NAND gates 139, 140 and 141. NAND gate 139 is coupled to the "0 – 34.4 Mbps data" and has as its reference signal the complement of the first reference signal or short sync reference signal $\overline{1\text{–}H}$ as generated by the 1 output of flip flop H of the midframe counter of counter and decoder 75 as shown in Curve B, FIG. 6 and NOT gate 142 and NAND gate 140 is coupled to the 1–34.4 Mbps data and has as its reference signal the first reference signal 1–H from flip flop H of the midframe counter of counter and decoder 75. The output of NAND gate 141 is coupled to comparison store 83 in the form of JK flip flop 143 and to halt mismatch store 84 in the form of JK flip flop 144. Flip flop 143 is clocked by the output of AND gate 145 and flip flop 144 is clocked by the output of AND gate 146. The latter two AND gates together with NAND gate 147, supplying one input to AND gate 146, and NOT gate 148 supplying one input to AND gate 145, form a part of compare logic 81. The purpose of clocking 143 and 146 at the time of occurrence of the overhead port (C27) is to insure that matches and mismatches due to the operation of compare logic 81 occurs only during the time of the overhead port and at no other time during a midframe. Mode O gate 88 includes NAND gate 149 while halt logic 86 includes NAND gate 150.

The long sync reference multiplexer 85 is an integrated circuit component SN74151 manufactured by Texas Instruments, Inc. and produces the reference signal for NAND gates 132 and 133. The second or long sync reference signal are the states of flip flops N-W of the superframe counter of counter and decoder 76 with the operation of multiplexer being under control of the addresses in the form of the M states of the H-M flip flops of midframe counter of counter and decoder 75.

The halt gate 78 illustrated in FIG. 3A is provided by an AND gate 151.

It should be noted that OR gate 102 of FIG. 2 feeding decision counter 90 of decision circuit 87 has been replaced in the logic diagram of FIG. 3A–3D by NAND gate 152. The reasons for this substitution is due to the type of logic components employed in the preceding circuitry of the frame synchronization system of the present invention.

Decision circuit 87 includes as the main component thereof the digital integrator in the form of a digital up-down counter 90 which is incremented one step at a time due to a match through AND gate 153, JK flip flop 154 and NAND gate 155. Up-down counter 90 is decremented two units at a time on mismatch through NAND gate 156 which has one input connected through NOT gate 157 to the output of NAND gate 152. The incrementing and decrementing of counter 90 is controlled by the mode 0 and mode 2 control signals from the output of mode decoder 94 through means of NAND gates 158, 159 and 160. Up-down counter, the decision counter, 90 may be an integrated circuit component SN74193 manufactured by Texas Instruments, Inc. including therein four flip flop stages to enable counting up to a value of 32 counts.

The threshold detectors 91 include a NAND gate 161 to detect the occurrence of the upper threshold level and has its output coupled to the binary 0 output of the four stages of counter 90. The low threshold level detector is provided by NOR gate 162 which is coupled to the binary 0 output of the last three flip flop stages of counter 90.

As pointed out hereinabove with respect to FIG. 2 the results of the comparison of the short sync code and the long sync code are coupled to counter 90 under control of the mode control circuits including mode 1 flip flop 92 in the form of a JK-type flip flop and a mode 2 flip flop 93 also in the form of a JK-type flip flop. Mode 1 flip flop 92 is driven by the output of the upper threshold detector NAND gate 161 through NOR gate 163 while mode 2 flip flop 93 is driven by the output of mode 1 mismatch counter 164 which forms a portion of the mode decoder 94. Counter 164 may be an integrated circuit component SN74161 manufactured by Texas Instruments, Inc. and has the function described hereinabove with respect to the description of FIG. 2.

Mode decoder 94 decodes the output of flip flop 92 and 93 to provide the three mode control signals which are employed in other circuit components of the frame synchronization system of this invention. The decoding operation of decoder 94 to generate the mode control signals is set forth in TABLE VIII presented hereinbelow.

TABLE VIII

Mode Gating

| Mode 1 Flip-Flop State | Mode 2 Flip-Flop State | Mode | Function |
|---|---|---|---|
| 0 | 0 | 0 | Short Sync Compare |
| 1 | 0 | 1 | Long Sync Load |
| 1 | 1 | 2 | Long Sync Compare |
| 0 | 1 | 0 | Short Sync Compare |

In TABLE VIII not only is the mode control signal indicated but also there is indicated the function that the frame synchronization system will perform under control of a particular mode control signal.

As illustrated in FIGS. 3A-3D the mode 0 control signal is produced directly from the binary 0 output of flip flop 92 while the mode 1 control signal is produced by AND gate 165 and the mode 2 control signal is produced by NOR gate 166. AND gates 167 and 168, NAND gate 169, NAND gate 170 and NOT gate 171 in cooperation with mode 1 mismatch counter 164 produce a signal to clock the mode 2 flip flop 93.

The destuff control logic includes destuff match counter 95 incorporating therein three JK-type flip flops 172, 173 and 174 with flip flop 172 being clocked by the output of NAND gate 175 having one input coupled to the output of compare logic 80, a second input receiving a timing signal 1–SUB2MG from logic 77 and the third input receiving the output signal of NAND gate 176 whose inputs are coupled to the binary 1 output of flip flops 172–174. The destuff decision logic 96 is provided by NAND gate 177 having one input coupled to the output of NAND gate 176, a second input receiving the 1-DESTUFF GATE timing signal from logic 77 and its third input receiving the 1–C27 timing signal from logic 77.

The long sync loader, which operates only in mode 1, includes one bit store 97 in the form of a D-type flip flop whose output is fed to compare logic 98 in the form of EXCLUSIVE NOR logic including NAND gates 178 and 179 and NAND gate 180. The first pair store and loader mode gates 99 includes a D-type flip flop 181 to store the first pair of long sync code word bits and the loader mode gates include NAND gate 182 to load the received overhead data into load data demultiplexer 100 which receives its addresses from the flip flops K, L and M of the midframe counter included in the counter and decoder 75. The other gate in loader mode gates 99 include NAND gate 183 whose output clocks the mode 1 mismatch counter 164 and also provides one of the inputs to NAND gate 184 with the other input thereof being provided by NOT gate 185 coupled to the output of NOR gate 163. The output of NOT gate 185 has the function of mode 0 clear. The output of NOR gate 184 is used to excite the reset circuit 101 which through NOT gate 186 loads the counter of midframe counter and decoder 75 with binary 0, through NOT gate 187 clears flip flops N, P, Q and R and through NOT gate 188 clears flip flops S, U and W in the superframe counter and decoder 76 so as to enable the overhead data present in demultiplexer 101 to be inserted into the appropriate flip flops of the superframe counter to provide an error free reference signal for the long sync code compare logic 80. Mode data demultiplexer 100 may be an integrated circuit component SN74155 manufactured by Texas Instruments, Inc.

AND gate 190 of reset gates 79 produces the orderwire PCM reset.

Figure 9:
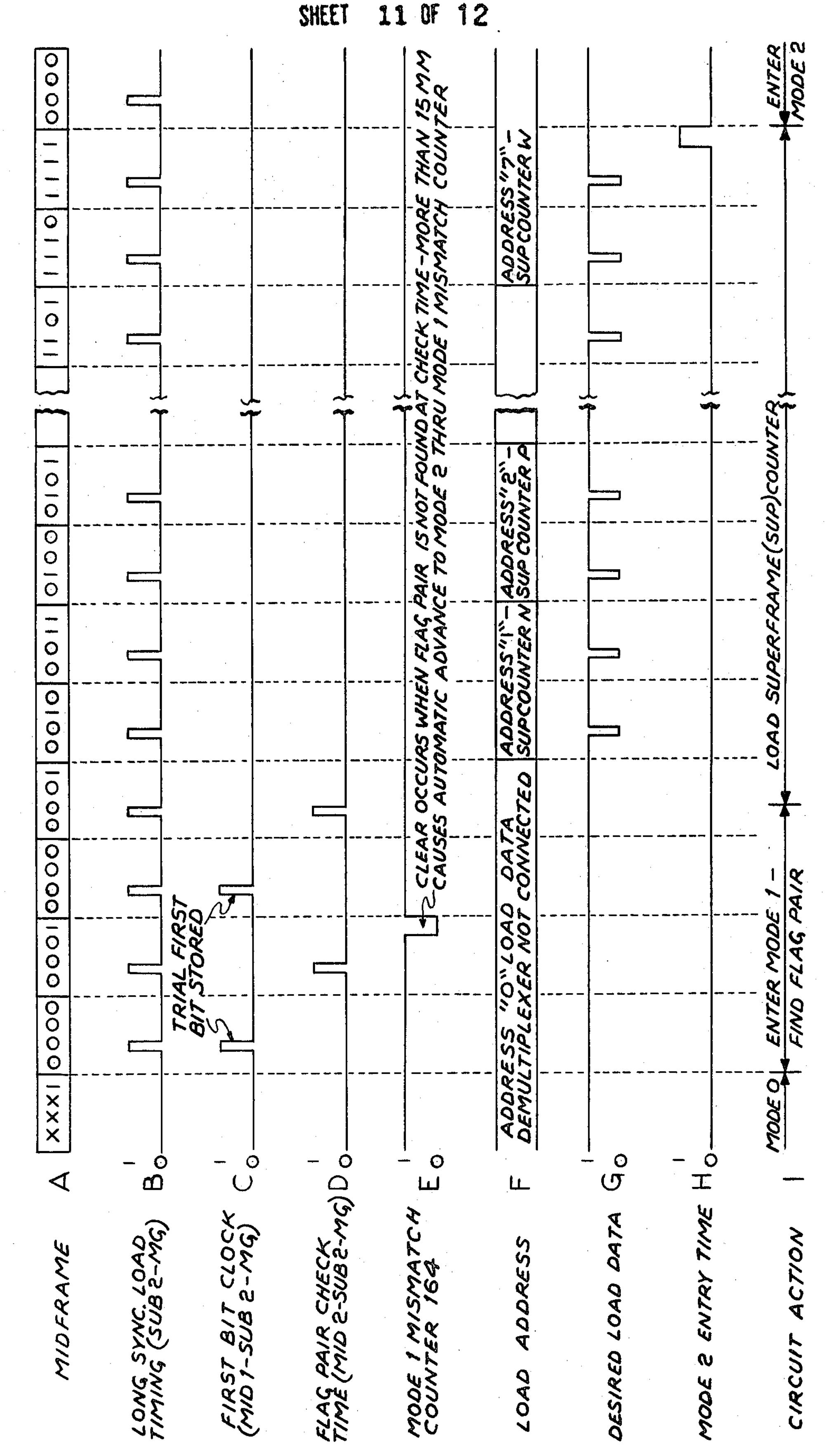
FIG. 9 is a timing diagram illustrating the operation of the frame synchronization circuit of FIGS. 3A-3D in mode 1.
Figure 10:
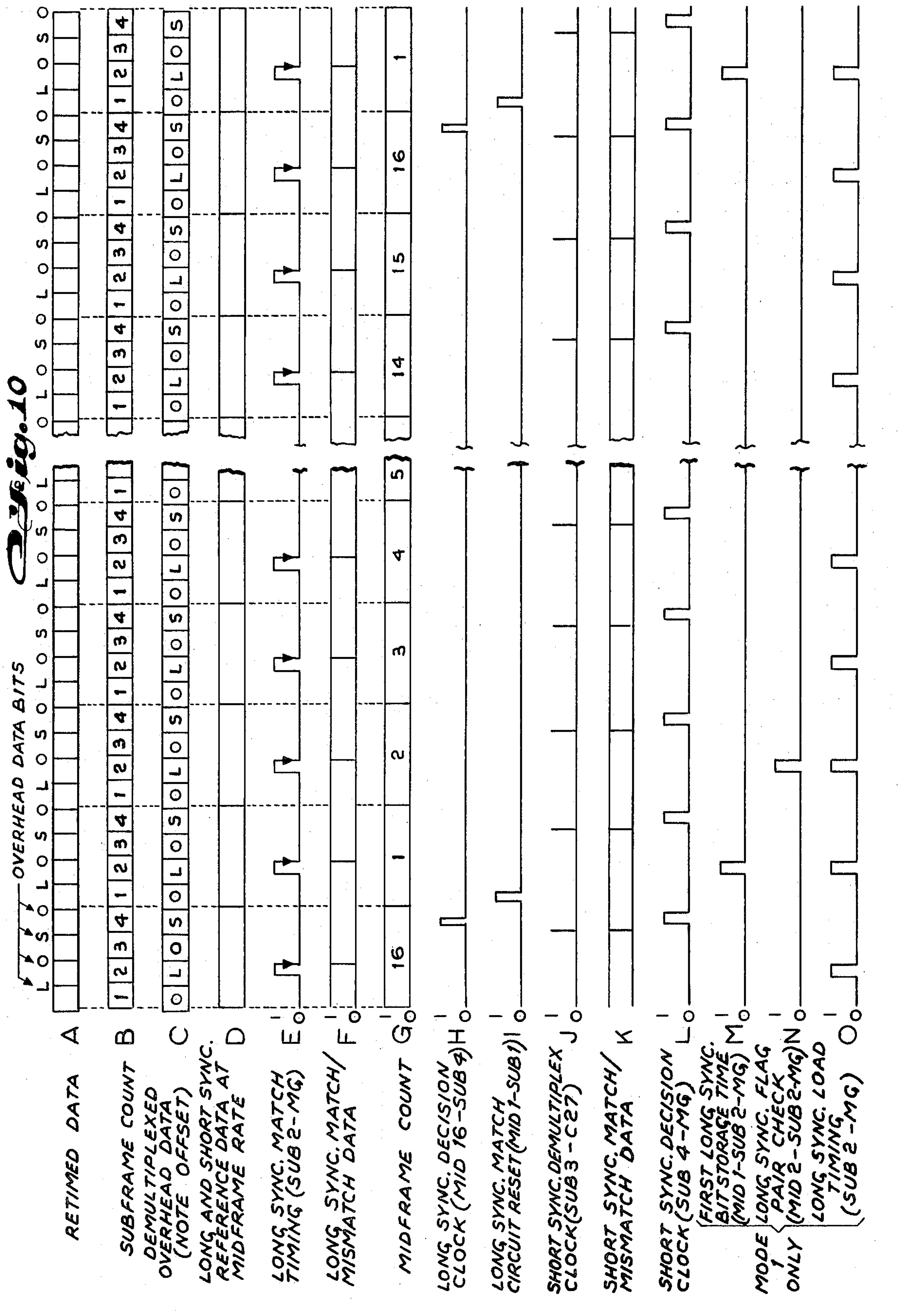
FIG. 10 is a timing diagram illustrating the operation of the frame synchronization system of FIGS. 3A–3D in mode 2 and in addition illustrating the relationship between certain of the timing curves of mode 2 to certain of the timing curves in mode 1.

The operation of FIGS. 3A-3D, one logic diagram implementation of the frame synchronization system of FIG. 2, operates as described hereinabove with respect to FIG. 2. The timing diagrams for the operation of the framing system in mode 0 is illustrated in FIG. 8, the operation of the framing system in mode 1 is illustrated in FIG. 9 and the operation of the framing system in mode 2 is illustrated in Curves A to L, FIG. 10 with Curves M, N and O, FIG. 10 illustrated in relationship between three timing signals present ony in mode 1 in relation to the mode 2 timing signals.

Figure 8:
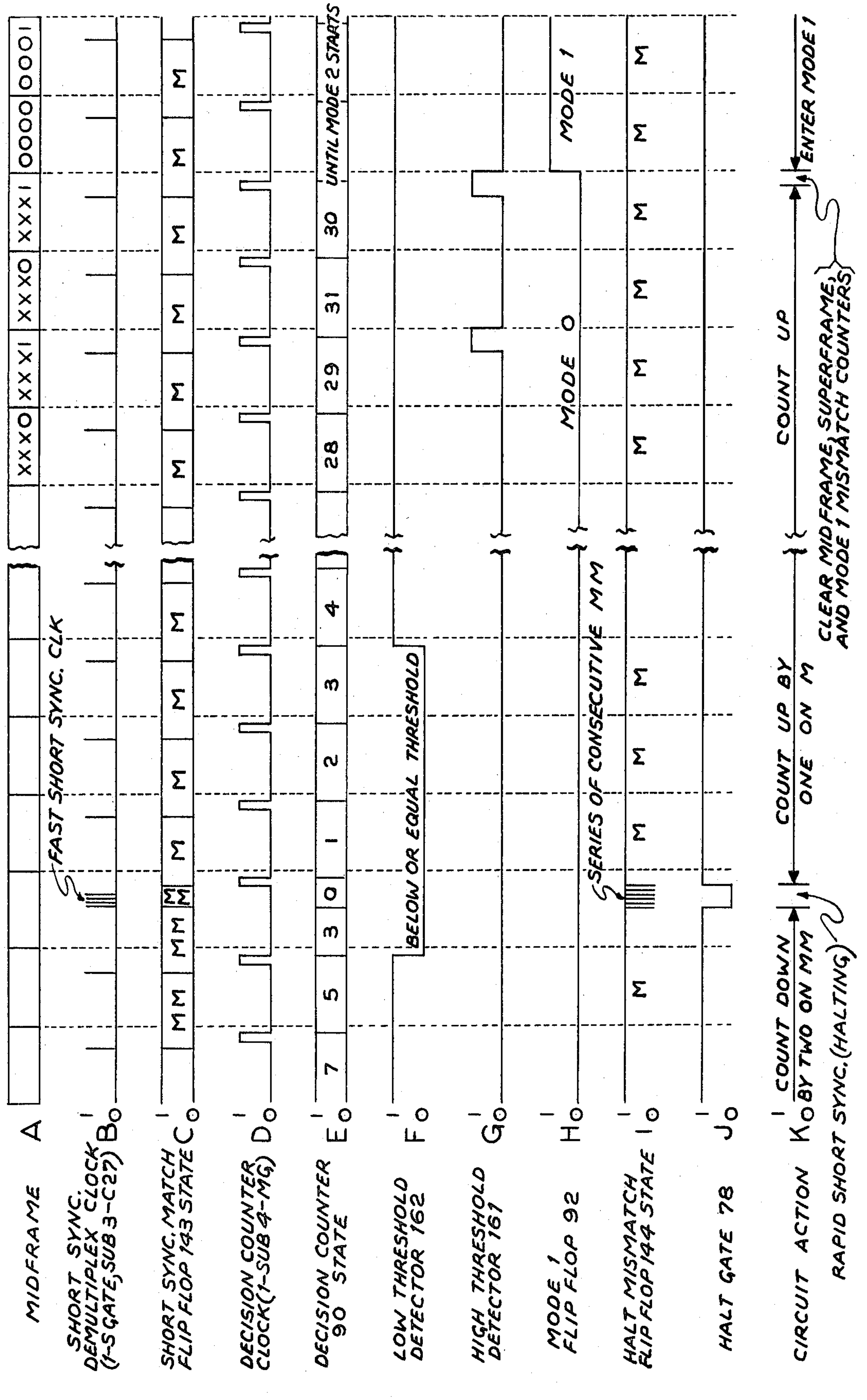
FIG. 8 is a timing diagram illustrating the operation of the framing circuit of FIGS. 3A–3D in mode 0.

In Curve B, FIG. 8 there is illustrated pulse identified as "fast short sync clk." These clock puses are produced during the HALT pulse (Curve J, FIG. 8) due to the phase shift that takes place in the port counter when the 34.4 Mbps clock is blocked by halt gate 78 and, thus, the production of a number of different phased C27 timing signals.

While I have described above the principles of my invention in connection with specific apparatus it is to be clearly understood that this description is made only by way of example and not as a limitation to the scope of my invention as set forth in the objects thereof and in the accompanying claims.

I claim:

1. A frame synchronization system for a time division multiplex binary data signal having a multiframe including X superframes, each of said X superframes including M midframes, each of said M midframes including m subframes, each of said m subframes including x ports, said data signal including an overhead data channel having at least a first sync signal having a first predetermined pattern composed of Y bits disposed in adjacent ones of said M midframes and a second sync signal having a second predetermined pattern different than said first predetermined pattern composed of M bits, each of said M bits being disposed in a different one of said M midframes, where x, M, *m*, *x* and Y are all integers greater than one, comprising:

a source of said data signal;

first means coupled to said source to produce timing signals including a first reference signal for said first sync signal and a second reference signal for said second sync signal;

a first digital comparator coupled to said source and said first means responsive to said data signal and said first reference signal to produce a first output signal indicative of the matches and mismatches between said data signal and said first reference signal;

a second digital comparator coupled to said source and said first means responsive to said data signal and said second reference signal to produce a second output signal indicative of the matches and mismatches between said second sync signal and said second reference signal;

a second means responsive to said first output signal and said second output signal in sequence to produce a first control signal and a second control signal;

third means coupled between said first and second comparators and the input of said second means and to the output of said second means responsive to said second control signal to control the coupling of said first and second output signals to the input of said second means; and fourth means coupled to said first means, said first comparator said second means and said third means responsive to said first output signal and said first control signals and under control of said third means to establish and maintain synchronization between said timing signals and said data signals.

2. A system according to claim 1, wherein each of said Y bits and each of said M bits are disposed in a given one of said x ports and in a different one of said m subframes.

3. A system according to claim 2, wherein

Y is equal to two and said first pattern is alternate binary 0 and binary 1 in adjacent ones of said M midframes.

4. A system according to claim 3, wherein

X is equal to 60, M is equal to 16 and *m* is equal to 4, each of said Y bits are present in the third of said m subframes in adjacent ones of said M midframes, and each of said *m* bits are present in the first of said m subframes of a different one of said M midframes.

5. A system according to claim 4, wherein the first two of said M bits of said second sync signal are a selected one of the binary bit sequences 10 and 01 and the remaining (M−2) bits of said second sync signal have any sequence.

6. A system according to claim 5, wherein said system is employed in an asynchronous demultiplexer, said data signal is rendered synchronous by employing a stuffing only technique, and a destuff command at said demultiplexer is conveyed by a predetermined number of bits of said M bits of said second sync signal.

7. A system according to claim 6, wherein said predetermined number of bits is the first two bits of said M bits of said second sync signal where the binary sequence 10 indicates the need of a destuffing action and the binary sequence 01 indicates no destuffing action.

8. A system according to claim 6, wherein
said predetermined number of bits is the first 13 bits of said M bits of said second sync signal where the binary sequence 10 of the first two of the first 13 bits indicates the need of a destuffing action and the binary sequence 01 of the first two of the first 13 bits indicates no destuffing action.

9. A system according to claim 4, wherein
said system is employed in an asynchronous demultiplexer,
said data signal is rendered synchronous by employing a stuffing only technique,
said M bits of said second sync signal have a first bit sequence of 01, AA, BB, CC, DD, EE, FF, GG to indicate a no destuffing action by said demultiplexer, and
said M bits of said second sync signal have a second bit sequence of 10, $\overline{AA}$, $\overline{BB}$, $\overline{CC}$, $\overline{DD}$, $\overline{EE}$, $\overline{FF}$, $\overline{GG}$ to indicate a destuffing action by said demultiplexer.

10. A system according to claim 9, wherein
the first 13 bits of said first bit sequence forms the no destuff control words, and
the first 13 bits of said second bit sequence forms the destuff control word.

11. A system according to claim 1, wherein
said first means includes
fifth means coupled to said source to extract a bit rate clock from said data signal,
a port counter coupled to said fifth means responsive to said bit rate clock, said port counter having a division factor equal to *x*,
a subframe counter coupled to said port counter, said subframe counter having a division factor equal to *m*,
a midframe counter coupled to said subframe counter, said midframe counter having a division factor equal to M,
a superframe counter coupled to said midframe counter, said superframe counter having a division factor equal to X,
first logic circuitry coupled to said port counter to produce said first reference signal, and
the states of the stages of said superframe counter providing said second reference signal; and
said first reference signal is the 1 output of the first stage of said midframe counter.

12. A system according to claim 11, further including sixth means coupled to said source and said logic circuitry responsive to said first reference signal to demultiplex said overhead channel data from said data signal, and
seventh means coupled to said sixth means and said third means under control of said third means to clear said superframe counter and to load said overhead channel data into said superframe counter at a predetermined time between coupling said first output signal to said third means and coupling said second output signal to said third means.

13. A system according to claim 12, wherein
said second means includes
a decision counter, and
a threshold detector having a first threshold level and a second threshold level higher than said first threshold level, said detector producing said first control signal when the signal from said decision circuit is equal to or less than said first threshold level and said second control signal when the signal from said decision circuit is equal to or greater than said second threshold level.

14. A system according to claim 13, wherein
said decision counter includes
an up-down counter.

15. A system according to claim 13, wherein
said third means includes
second logic circuitry coupled to said threshold detector responsive to said second control signal to produce third, fourth and fifth control signals sequentially in the order named,
a first gate circuit coupled between said first comparator and said decision circuit controlled by said third control signal to couple said first output signal to said decision circuit, and
a second gate circuit coupled between said second comparator and said decision circuit controlled by said fifth control signal to couple said second output signal to said decision circuit,
said fourth control signal being coupled to said seventh means to control the loading of said overhead channel data into said superframe counter.

16. A system according to claim 15, wherein
said fourth means includes
third logic circuitry coupled to said first comparator, said threshold detector and said second logic circuitry responsive to said first output signal, said first control signal and said third control signal to produce a HALT signal during said third control signal when both said first output signal and said first control signal indicate an out-of-sync condition, and
a third gate circuit coupled between said fifth means and said port counter to inhibit coupling said bit rate clock to said port counter to cooperate in establish and maintain synchronization between said timing signals and said data signals.

17. A system according to claim 16, wherein
each of said first and second comparators is an EXCLUSIVE-NOR gate.

18. A system according to claim 1, wherein
said second means includes
a decision counter, and
a threshold detector having a first threshold level and a second threshold level higher than said first threshold level, said detector producing said first control signal when the signal from said decision circuit is equal to or less than said first threshold level and said second control signal when the signal from said decision circuit is equal to or greater than said second threshold level.

19. A system according to claim 18, wherein
said decision counter includes
an up-down counter.

20. A system according to claim 1, wherein
said third means includes
logic circuitry coupled to said second means responsive to said second control signal to produce third and fourth control signals sequentially in the order named, a first gate circuit coupled between said first comparator and said second means controlled by said third control signal to couple said first output signal to said second means, and a second gate circuit coupled between said second comparator and said second means controlled by said fourth control signal to couple said second output signal to said second means.

21. A system according to claim 1, wherein said fourth means includes logic circuitry coupled to said first means, said first comparator, said second means and said third means, said logic circuitry being responsive to said first output signal and said first control signal and under control of said third means to establish and maintain synchronization between said timing signals and said data signals.

22. A frame synchronization system for a time division multiplex binary data signal having a multiframe including X superframes, each of said X superframes including M midframes, each of said M midframes including m subframes, each of said m subframes including *x* ports, said data signal including an overhead data channel having a first sync signal having a first predetermined pattern composed of Y bits disposed in adjacent ones of said M midframes and one of a second sync signal and a third sync signal, said second sync signal having a second predetermined pattern different than said first predetermined pattern composed of M bits, each of said M bits being disposed in a different one of said M midframes, and said third sync signal being the complement of said second sync signal, where X, M, *m*, *x* and Y are all integers greater than one, comprising:

a source of said data signal;

first means coupled to said source to produce timing signals including a first reference signal for said first sync signal and a second reference signal for said second and third sync signals;

a first digital comparator coupled to said source and said first means responsive to said data signal and said first reference signal to produce a first output signal indicative of the matches and mismatches between said data signal and said first reference signal;

a second digital comparator coupled to said source and said first means responsive to said data signal and said second reference signal to produce a second output signal indicative of the matches and mismatches between one of said second and third sync signals and said second reference signal;

a second means responsive to said first output signal and said secpmd output signal in sequence to produce a first control signal and a second control signal;

third means coupled between said first and second comparators and the input of said second means and to the output of said second means responsive to said second control signal to control the coupling of said first and second output signals to the input in said second means; and fourth means coupled to said first means, said first comparator, said second means and said third means responsive to said first output signal and said first control signal and under control of said third means to establish and maintain synchronization between said timing signals and said data signals.

23. A system according to claim 22, wherein said system is employed in an asynchronous demultiplexer, said data signal is rendered synchronous by employing a stuffing only technique, said M bits of said second sync signal having a first bit sequence of 01, AA, BB, CC, DD, EE, FF, GG to indicate a no destuffing action by said demultiplexer, and said M bits of said third sync signal having a second said sequence of 10, $\overline{AA}$, $\overline{BB}$, $\overline{CC}$, $\overline{DD}$, $\overline{EE}$, $\overline{FF}$, $\overline{GG}$ to indicate a destuffing action by said demultiplexer.

24. A system according to claim 23, wherein the first 13 bits of said first bit sequence forms the no destuff control word, and the first 13 bits of said second bit sequence forms the destuff control word.

* * * * *